United States Patent
Li et al.

(10) Patent No.: US 9,345,057 B2
(45) Date of Patent: May 17, 2016

(54) METHOD AND TERMINAL FOR ESTABLISHING A COMMUNICATION CONNECTION

(71) Applicant: Huawei Device Co., Ltd., Shenzhen, Guangdong (CN)

(72) Inventors: Guoqing Li, Beijing (CN); Zhihao Jin, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/690,701

(22) Filed: Apr. 20, 2015

(65) Prior Publication Data
US 2015/0230283 A1  Aug. 13, 2015

Related U.S. Application Data

(63) Continuation of application No. PCT/CN2012/083692, filed on Oct. 29, 2012.

(51) Int. Cl.
H04B 5/00 (2006.01)
H04W 76/02 (2009.01)
H04W 8/00 (2009.01)

(52) U.S. Cl.
CPC ........... *H04W 76/023* (2013.01); *H04B 5/0031* (2013.01); *H04W 8/005* (2013.01)

(58) Field of Classification Search
CPC ... H04B 5/0031; H04W 8/005; H04W 76/023
USPC ................... 455/39, 73, 41.1, 41.2
See application file for complete search history.

(56) References Cited

U.S. PATENT DOCUMENTS

| 8,224,246 B2 | 7/2012 | Suumaeki et al. |
| 2009/0111378 A1 | 4/2009 | Sheynman et al. |

(Continued)

FOREIGN PATENT DOCUMENTS

| CN | 101594578 A | 12/2009 |
| CN | 102523562 A | 6/2012 |

(Continued)

OTHER PUBLICATIONS

"Part 11: Wireless LAN Medium Access Control (MAC) and Physical Layer (PHY) Specifications", IEEE Std 802.11™, IEEE standard association, dated Mar. 29, 2012, total 2793 pages.
Jan Suumäki, "Wi-Fi Protected Setup using NFC, NFCForum-AN-WiFiProtectedSetup with IBSS-0.1", dated May 20, 2011, total 42 pages.

(Continued)

*Primary Examiner* — Tuan Pham
(74) *Attorney, Agent, or Firm* — Huawei Device Co., Ltd.

(57) ABSTRACT

A method and a terminal for establishing a communication connection. In an embodiment, the method for establishing a communication connection includes: exchanging, by a first terminal, Wi-Fi Direct configuration information with a second terminal through a near field communication connection between the first terminal and the second terminal, where the exchanged Wi-Fi Direct configuration information includes group information of the first terminal or second terminal; and establishing a Wi-Fi Direct connection between the first terminal and the second terminal according to the exchanged Wi-Fi Direct configuration information. The present invention can simplify a process of establishing a Wi-Fi Direct connection, so that both of two terminals can establish a Wi-Fi Direct connection within an NFC communication range.

18 Claims, 17 Drawing Sheets

(56) References Cited

U.S. PATENT DOCUMENTS

| | | |
|---|---|---|
| 2011/0275316 A1 | 11/2011 | Suumaeki et al. |
| 2012/0099566 A1 | 4/2012 | Laine et al. |
| 2012/0158981 A1 | 6/2012 | Desai et al. |
| 2012/0265913 A1 | 10/2012 | Suumaeki et al. |
| 2012/0290731 A1 | 11/2012 | Suumaeki et al. |
| 2013/0337806 A1* | 12/2013 | Barash .......... H04W 48/16 455/434 |
| 2014/0032951 A1* | 1/2014 | Garg .......... H04W 52/0219 713/323 |
| 2014/0092885 A1* | 4/2014 | Venkatachalam ... H04W 76/023 370/338 |

FOREIGN PATENT DOCUMENTS

| | | |
|---|---|---|
| EP | 2445257 A1 | 4/2012 |
| JP | 2012147422 A | 8/2012 |

OTHER PUBLICATIONS

"Wi-Fi Peer-to-Peer (P2P) Technical Specification Version 1.3 draft 03", Wi Fi Alliance, dated 2010, total 176 pages.

'Near Filed Communication White Paper, Ecma1TC32-TG19/2004/1, XP007900374, 2004, total 10 pages.

\* cited by examiner

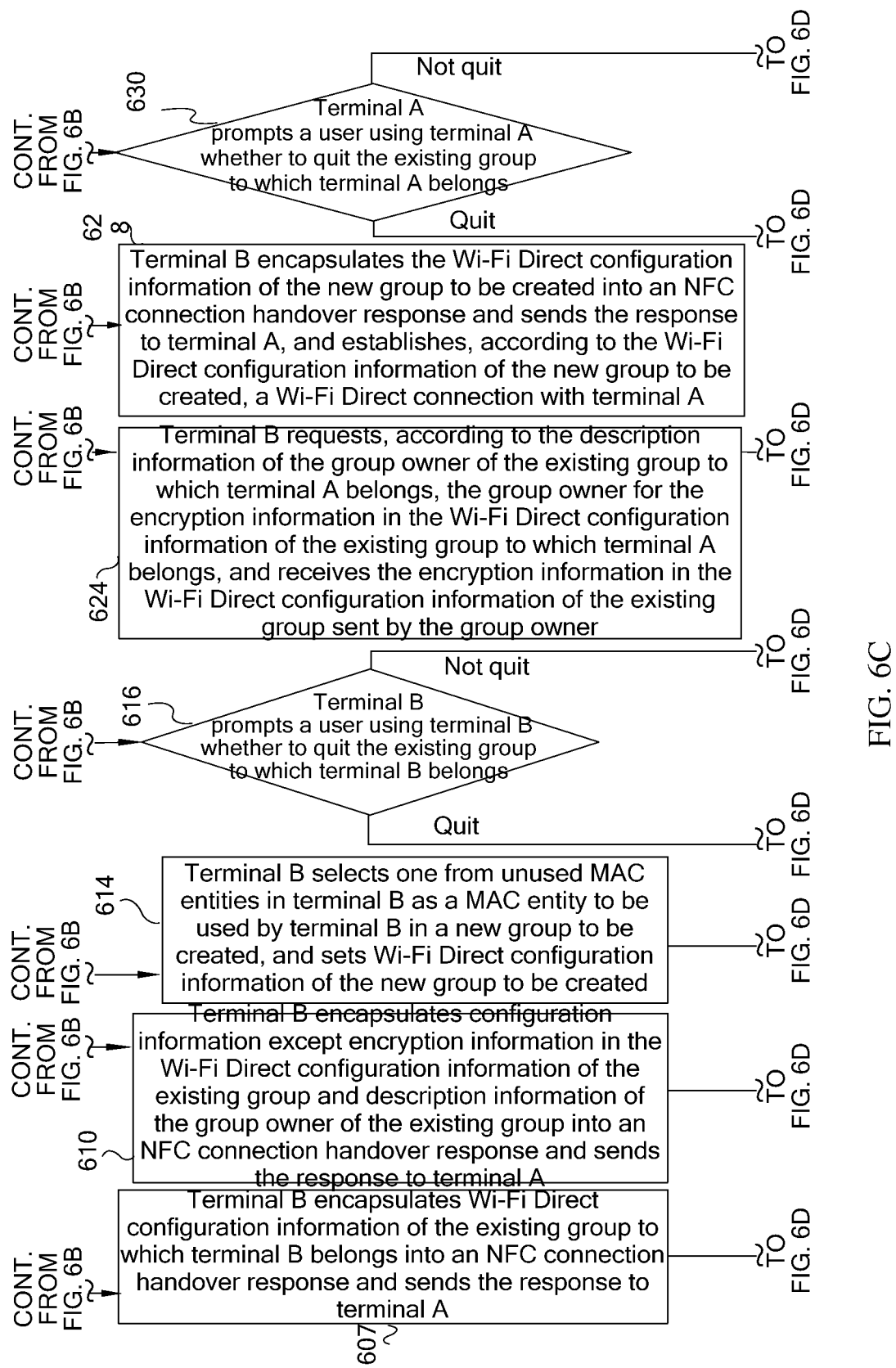

METHOD AND TERMINAL FOR ESTABLISHING A COMMUNICATION CONNECTION

CROSS-REFERENCE TO RELATED APPLICATIONS

This application is a continuation of International Application No. PCT/CN2012/083692, filed on Oct. 29, 2012, which is hereby incorporated by reference in its entirety.

TECHNICAL FIELD

The present invention relates to the field of communications technologies and in particular, to a method and a terminal for establishing a communication connection.

BACKGROUND

Near field communication (NFC) is a short-range wireless communications technology. It is based on radio frequency identification (RFID) technology, and uses electromagnetic induction to implement short-range communication between electronic devices. A user only needs to touch or approach a device to implement a visual, secure, and contactless information exchange, payment transaction, or the like. NFC operates on a 13.56 MHz frequency, and supports four rates: 106 kbit/s, 212 kbit/s, 424 kbit/s, and 848 kbit/s. NFC can work within a 20-centimeter range, and a typical value is 4 cm. NFC is quite suitable for exchange of small data due to its simple operation and low data transmission rate; for a large file (for example, a high definition picture or a high definition video in scores of megabytes), if NFC is used for transmission, a disadvantage of a low speed seriously affects user experience. Therefore, the NFC Forum puts forward an NFC-based connection handover technology. Two terminals that simultaneously support NFC, Bluetooth, and wireless fidelity (Wi-Fi) may simply touch each other to exchange connection configuration information of Bluetooth or Wi-Fi by using NFC. Afterward, the terminals may use the configuration information to establish a Bluetooth connection or a Wi-Fi connection, and use the established Bluetooth connection or Wi-Fi connection to transmit a large file.

Wi-Fi Direct is an 802.11-based point-to-point connection technology formulated by the Wi-Fi Alliance. Wi-Fi Direct may also be referred to as Wi-Fi point-to-point (Wi-Fi P2P). Wi-Fi Direct uses an 802.11 physical layer, and makes modifications to an existing 802.11 media access control (MAC) layer and higher layers so that the layers are suitable for a scenario in which two devices discover each other and establish a point-to-point connection.

In the prior art, a connection establishment procedure defined by the Wi-Fi Direct protocol includes processes such as device discovery, group owner (GO) negotiation, and exchange of Wi-Fi Protected Setup protocol (WPS) authentication information. The whole connection establishment procedure is relatively complicated and lengthy. In addition, two terminals not joining any group may use a manner defined by the Wi-Fi Direct protocol to establish a connection. A terminal not joining any group may use a manner defined by the Wi-Fi Direct protocol to join an existing group and communicate with a GO or with a client (Client) in the group through the GO. Due to restrictions of the Wi-Fi Direct protocol, a client in a group and a GO or client in another group cannot discover each other and further establish a connection and communicate with each other.

SUMMARY

The present invention provides a method and a terminal for establishing a communication connection, so as to simplify a process of establishing a Wi-Fi Direct connection such that both of two terminals can establish a Wi-Fi Direct connection between the two terminals within an NFC communication range.

In a first aspect, an embodiment of the present invention provides a method for establishing a communication connection, including: (1) sending, by a first terminal, wireless fidelity (Wi-Fi) Direct configuration information of the first terminal to a second terminal through a near field communication (NFC) connection between the first terminal and the second terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs; (2) receiving, by the first terminal, Wi-Fi Direct configuration information of the second terminal from the second terminal through the NFC connection between the first terminal and the second terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; and (3) establishing a Wi-Fi Direct connection between the first terminal and the second terminal according to the Wi-Fi Direct configuration information of the second terminal.

In a second aspect, an embodiment of the present invention provides a method for establishing a communication connection, including: (1) receiving, by a second terminal, wireless fidelity (Wi-Fi) Direct configuration information of a first terminal from the first terminal through a near field communication (NFC) connection between the second terminal and the first terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs; (2) sending, by the second terminal, Wi-Fi Direct configuration information of the second terminal to the first terminal through the NFC connection between the second terminal and the first terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; (3) establishing a Wi-Fi Direct connection between the second terminal and the first terminal according to the Wi-Fi Direct configuration information of the first terminal.

In a third aspect, an embodiment of the present invention provides a terminal, wherein the terminal is a first terminal and the terminal comprises a memory, configured to store an executable program code; and at least one processor, configured to run, by reading the executable program code stored in the memory, a program corresponding to the executable program code so as to perform the following steps: (1) send wireless fidelity (Wi-Fi) Direct configuration information of the first terminal to a second terminal through a near field communication (NFC) connection between the first terminal and the second terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs; (2) receive Wi-Fi Direct configuration information of the second terminal from the second terminal through the NFC connection between the first terminal and the second terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; and (3) establish a Wi-Fi Direct connection between the first terminal and the second terminal according to the Wi-Fi Direct configuration information of the second terminal.

In a fourth aspect, an embodiment of the present invention provides a terminal, wherein the terminal is a second terminal and the terminal comprises a memory, configured to store an executable program code; and at least one processor, configured to run, by reading the executable program code stored in the memory, a program corresponding to the executable program code so as to perform the following steps: (1) receive wireless fidelity (Wi-Fi) Direct configuration information of a first terminal from the first terminal through a near field communication (NFC) connection between the second terminal and the first terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs; (2) send Wi-Fi Direct configuration information of the second terminal to the first terminal through the NFC connection between the second terminal and the first terminal, wherein the Wi-Fi Direct configuration information of the second terminal comprises group information of the second terminal, the group information of the second terminal comprises: the second terminal being not a member of an existing group, or the second terminal being a group owner of an existing group to which the second terminal belongs, or the second terminal being a client of an existing group to which the second terminal belongs; and (3) establish a Wi-Fi Direct connection between the second terminal and the first terminal according to the Wi-Fi Direct configuration information of the first terminal. In embodiments of the present invention, the first terminal and the second terminal may exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure.

In addition, the Wi-Fi Direct protocol specifies that a client of a Wi-Fi Direct group cannot actively discover a GO or a client of another group. In this scenario, a Wi-Fi Direct connection cannot be established by using radio signaling, but this restriction does not exist when embodiments of the present invention are used. As long as the first terminal and the second terminal are within an NFC communication range, the first terminal and the second terminal can exchange configuration information, and both can establish a Wi-Fi Direct connection between the first terminal and the second terminal.

BRIEF DESCRIPTION OF DRAWINGS

FIG. 6A, FIG. 6B, FIG. 6C, and FIG. 6D are a flowchart of still another embodiment of a method for establishing a communication connection according to the present invention;

DESCRIPTION OF EMBODIMENTS

To make the objectives, technical solutions, and advantages of the present invention clearer, the present invention is described in further detail below with reference to embodiments and the accompanying drawings.

Figure 1:
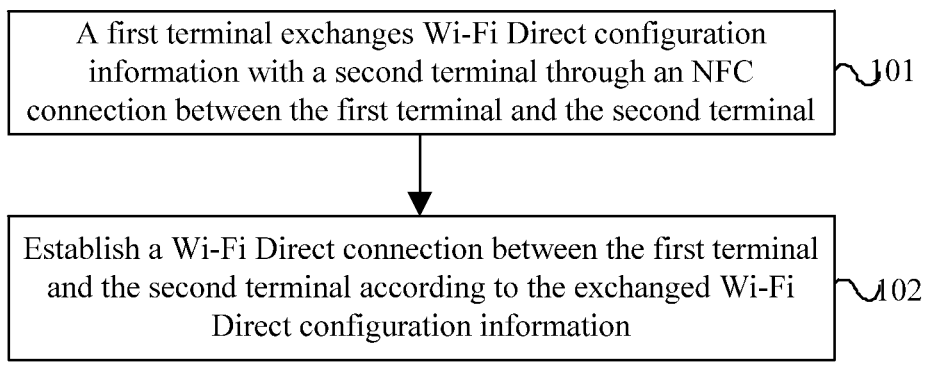
FIG. 1 is a flowchart of an embodiment of a method for establishing a communication connection according to the present invention.

FIG. 1 is a flowchart of an embodiment of a method for establishing a communication connection according to the present invention. As shown in FIG. 1, the method for establishing a communication connection may include:

Step 101: A first terminal exchanges Wi-Fi Direct configuration information with a second terminal through an NFC connection between the first terminal and the second terminal, where the exchanged Wi-Fi Direct configuration information includes group information of the first terminal or second terminal.

Step 102: Establish a Wi-Fi Direct connection between the first terminal and the second terminal according to the exchanged Wi-Fi Direct configuration information.

Specifically, in an embodiment, step 101 in which a first terminal exchanges Wi-Fi Direct configuration information with a second terminal through an NFC connection between the first terminal and the second terminal, may be: receiving, by the first terminal, Wi-Fi Direct configuration information of the second terminal, which is sent by the second terminal through the NFC connection.

The Wi-Fi Direct configuration information of the second terminal includes the group information of the second terminal.

Step 102 in which a Wi-Fi Direct connection is established between the first terminal and the second terminal according to the exchanged Wi-Fi Direct configuration information, may be: if the first terminal determines, according to the group information of the first terminal and the group information of the second terminal, that neither the first terminal nor the second terminal is a member of an existing group, establishing, by the first terminal, a Wi-Fi Direct connection with the second terminal according to Wi-Fi Direct configuration information of the first terminal and the Wi-Fi Direct configuration information of the second terminal; or if the first terminal determines, according to the group information of the first terminal and the group information of the second terminal, that at least one of the first terminal and the second terminal is a member of an existing group, establishing, by the first terminal, a Wi-Fi Direct connection with the second terminal according to Wi-Fi Direct configuration information of the existing group or a new group to be created.

It should be noted that in this embodiment, the establishing, by the first terminal, a Wi-Fi Direct connection with the second terminal according to Wi-Fi Direct configuration information of a new group to be created means that the first terminal creates a new group with the second terminal.

In this embodiment, the Wi-Fi Direct configuration information of the first terminal includes the group information of the first terminal, where a value of the group information of the first terminal may be: the first terminal being not a member of an existing group, or the first terminal being a group owner of an existing group to which the first terminal belongs, or the first terminal being a client of an existing group to which the first terminal belongs; further, the Wi-Fi Direct configuration information of the first terminal may further include: a group owner intent of the first terminal, the number of MAC entities in the first terminal, and an address of each MAC entity;

the Wi-Fi Direct configuration information of the second terminal may further include: a group owner intent of the second terminal, the number of MAC entities in the second terminal, and an address of each MAC entity; where a value of the group information of the second terminal may be: the second terminal being not a member of an existing group, or the second terminal being a group owner of an existing group to which the second terminal belongs, or the second terminal being a client of an existing group to which the second terminal belongs; and the Wi-Fi Direct configuration information of the new group to be created includes an identifier of the new group to be created, a BSSID of the new group to be created, an operating channel of the new group to be created, the group owner intent of the first terminal, an IP base address of the new group to be created, and an address of a MAC entity used by the first terminal in the new group to be created.

In an implementation manner of this embodiment, if the first terminal determines, according to the group information of the first terminal and the group information of the second terminal, that neither the first terminal nor the second terminal is a member of an existing group, the establishing, by the first terminal, a Wi-Fi Direct connection with the second terminal according to Wi-Fi Direct configuration information of the first terminal and the Wi-Fi Direct configuration information of the second terminal may be: setting, by the first terminal according to the Wi-Fi Direct configuration information of the first terminal and the Wi-Fi Direct configuration information of the second terminal, the Wi-Fi Direct configuration information of the new group to be created; then sending, by the first terminal, the Wi-Fi Direct configuration information of the new group to be created to the second terminal through the NFC connection; and finally, establishing, by the first terminal, a Wi-Fi Direct connection with the second terminal according to the Wi-Fi Direct configuration information of the new group to be created.

When setting the Wi-Fi Direct configuration information of the new group to be created, for example, when setting an identifier of the new group to be created, the first terminal may use a group identifier in the Wi-Fi Direct configuration information of the first terminal, or may also use a group identifier in the Wi-Fi Direct configuration information of the second terminal, or may neither use a group identifier in the Wi-Fi Direct configuration information of the first terminal nor use a group identifier in the Wi-Fi Direct configuration information of the second terminal but set a new identifier for the new group to be created. Likewise, the BSSID of the new group to be created, the operating channel of the new group to be created, the IP base address of the new group to be created, and the address of the MAC entity used in the new group to be created may also be set in the preceding manner, that is, corresponding information included in the Wi-Fi Direct configuration information of the first terminal or second terminal may be used, or a new value is set. Details are not repeated herein.

In another implementation manner of this embodiment, determining, by the first terminal according to the group information of the first terminal and the group information of the second terminal, that at least one of the first terminal and the second terminal is a member of an existing group may be:

determining, by the first terminal according to the group information of the first terminal and the group information of the second terminal, that the first terminal is a member of an existing group and the second terminal is not a member of an existing group.

Further, the first terminal receives a default setting of the second terminal, which is sent by the second terminal through the NFC connection. Specifically, the default setting of the second terminal may be included in the Wi-Fi Direct configuration information of the second terminal and sent to the first terminal; or the default setting may also not be included in the Wi-Fi Direct configuration information of the second terminal but is sent to the first terminal along with the Wi-Fi Direct configuration information of the second terminal, where the default setting reflects that the second terminal requests to join the existing group to which the first terminal belongs or that the second terminal requests to create a new group with the first terminal.

In a specific implementation manner of this implementation manner, the establishing, by the first terminal, a Wi-Fi Direct connection with the second terminal according to Wi-Fi Direct configuration information of the existing group may be: determining, by the first terminal according to the default setting of the second terminal, that the second terminal requests to join the existing group to which the first terminal belongs; if the first terminal determines, according to the group information of the first terminal, that the first terminal is a group owner of the existing group to which the first terminal belongs, sending, by the first terminal, Wi-Fi Direct configuration information of the existing group to which the first terminal belongs, to the second terminal through the NFC connection, so that the second terminal sets a value of the group owner intent in the Wi-Fi Direct configuration information of the second terminal to a value smaller than a value of the group owner intent in the Wi-Fi Direct configuration information of the first terminal according to the Wi-Fi Direct configuration information of the existing group, and in this way, the second terminal can be used as a client to join the existing group to which the first terminal belongs; and then establishing, by the first terminal, a Wi-Fi Direct connection with the second terminal according to the Wi-Fi Direct configuration information of the existing group.

In another specific implementation manner of this implementation manner, the establishing, by the first terminal, a Wi-Fi Direct connection with the second terminal according to Wi-Fi Direct configuration information of the existing group may be: determining, by the first terminal according to the default setting of the second terminal, that the second terminal requests to join the existing group to which the first terminal belongs; if the first terminal determines, according to the group information of the first terminal, that the first terminal is a client of the existing group to which the first terminal belongs, sending, by the first terminal, configuration information except encryption information in the Wi-Fi Direct configuration information of the existing group and description information of a group owner of the existing group to the second terminal through the NFC connection, so that the second terminal requests the group owner for the encryption information in the Wi-Fi Direct configuration information of the existing group according to the description information of the group owner and receives the encryption information in the Wi-Fi Direct configuration information of the existing group sent by the group owner, and in this way, the second terminal obtains all Wi-Fi Direct configuration information of the existing group to which the first terminal belongs; and then, establishing, by the first terminal, a Wi-Fi Direct connection with the second terminal according to the Wi-Fi Direct configuration information of the existing group.

In still another specific implementation manner of this implementation manner, the establishing, by the first terminal, a Wi-Fi Direct connection with the second terminal according to Wi-Fi Direct configuration information of a new group to be created may be: determining, by the first terminal according to the default setting of the second terminal, that the second terminal requests to create a new group with the first terminal; if the first terminal determines that the first terminal includes at least one unused MAC entity, selecting, by the first terminal, one from unused MAC entities in the first terminal as a MAC entity to be used by the first terminal in the new group to be created, and setting the Wi-Fi Direct configuration information of the new group to be created; then, sending, by the first terminal, the Wi-Fi Direct configuration information of the new group to be created to the second terminal through the NFC connection, and establishing, according to the Wi-Fi Direct configuration information of the new group to be created, a Wi-Fi Direct connection with the second terminal, where the Wi-Fi Direct configuration information of the new group to be created does not conflict with Wi-Fi Direct configuration information of the existing group to which the first terminal belongs, and the Wi-Fi Direct configuration information of the new group to be created further includes the group information of the first terminal. Specifically, when setting the Wi-Fi Direct configuration information of the new group to be created, the first terminal may use a part or all of the Wi-Fi Direct configuration information of the second terminal, or may also not use the Wi-Fi Direct configuration information of the second terminal but set new Wi-Fi Direct configuration information for the new group to be created. The present invention does not limit a manner of setting, by the first terminal, the Wi-Fi Direct configuration information of the new group to be created, as long as the Wi-Fi Direct configuration information of the new group to be created does not conflict with the Wi-Fi Direct configuration information of the existing group to which the first terminal belongs.

In still another specific implementation mode of this implementation manner, the establishing, by the first terminal, a Wi-Fi Direct connection with the second terminal according to Wi-Fi Direct configuration information of a new group to be created may be: determining, by the first terminal according to the default setting of the second terminal, that the second terminal requests to create a new group with the first terminal; if the first terminal determines that all MAC entities in the first terminal are used, prompting, by the first terminal, a user using the first terminal whether to quit the existing group to which the first terminal belongs; if the user using the first terminal selects to quit the existing group to which the first terminal belongs, quitting, by the first terminal, the existing group to which the first terminal belongs, and then setting, according to the Wi-Fi Direct configuration information of the first terminal and the Wi-Fi Direct configuration information of the second terminal, the Wi-Fi Direct configuration information of the new group to be created, where a value of the group owner intent of the first terminal is different from a value of the group owner intent of the second terminal in the Wi-Fi Direct configuration information of the new group to be created; and next, sending, by the first terminal, the Wi-Fi Direct configuration information of the new group to be created to the second terminal through the NFC connection, and establishing, according to the Wi-Fi Direct configuration information of the new group to be created, a Wi-Fi Direct connection with the second terminal.

In still another implementation manner of this embodiment, determining, by the first terminal according to the group information of the first terminal and the group information of the second terminal, that at least one of the first terminal and the second terminal is a member of an existing group may be: determining, by the first terminal according to the group information of the first terminal and the group information of the second terminal, that the second terminal is a member of an existing group and the first terminal is not a member of an existing group.

In a specific implementation manner of this implementation manner, the establishing, by the first terminal, a Wi-Fi Direct connection with the second terminal according to Wi-Fi Direct configuration information of the existing group may be: determining, by the first terminal according to a default setting of the first terminal, that the first terminal requests to join the existing group to which the second terminal belongs; if the first terminal determines, according to the group information of the second terminal, that the second terminal is a group owner of the existing group to which the second terminal belongs, setting, by the first terminal, a value of the group owner intent in the Wi-Fi Direct configuration information of the first terminal to a value smaller than a value of the group owner intent in the Wi-Fi Direct configuration information of the second terminal, so that the first terminal can join the existing group as a client of the existing group to which the second terminal belongs; and then establishing, by the first terminal, a Wi-Fi Direct connection with the second terminal according to the Wi-Fi Direct configuration information of the second terminal, where the Wi-Fi Direct configuration information of the second terminal is Wi-Fi Direct configuration information of the existing group to which the second terminal belongs.

In another specific implementation manner of this implementation manner, when the second terminal is a client of the existing group to which the second terminal belongs, the Wi-Fi Direct configuration information of the second terminal is configuration information except encryption information in Wi-Fi Direct configuration information of the existing group to which the second terminal belongs; further, the first terminal further receives description information of a group owner of the existing group to which the second terminal belongs, which is sent by the second terminal through the NFC connection. Specifically, the description information of the group owner of the existing group to which the second terminal belongs may be included in the Wi-Fi Direct configuration information of the second terminal; or the description information of the group owner of the existing group to which the second terminal belongs may also not be included in the Wi-Fi Direct configuration information of the second terminal but is sent to the first terminal along with the Wi-Fi Direct configuration information of the second terminal.

In this way, the establishing, by the first terminal, a Wi-Fi Direct connection with the second terminal according to Wi-Fi Direct configuration information of the existing group may be: determining, by the first terminal according to a default setting of the first terminal, that the first terminal requests to join the existing group to which the second terminal belongs; requesting, by the first terminal according to the description information of the group owner of the existing group to which the second terminal belongs, the group owner for the encryption information in the Wi-Fi Direct configuration information of the existing group to which the second terminal belongs, and receiving the encryption information in the Wi-Fi Direct configuration information of the existing group sent by the group owner; and then establishing, by the first terminal, a Wi-Fi Direct connection with the second terminal according to the Wi-Fi Direct configuration information of the existing group.

In still another specific implementation manner of this implementation manner, the establishing, by the first terminal, a Wi-Fi Direct connection with the second terminal according to Wi-Fi Direct configuration information of a new group to be created may be: determining, by the first terminal according to a default setting of the first terminal, that the first terminal requests to create a new group with the second terminal; if the first terminal determines that the second terminal includes at least one unused MAC entity, selecting, by the first terminal, one from unused MAC entities in the second terminal, and setting the Wi-Fi Direct configuration information of the new group to be created; and then sending, by the first terminal, the Wi-Fi Direct configuration information of the new group to be created to the second terminal through the NFC connection, and establishing, according to the Wi-Fi Direct configuration information of the new group to be created, a Wi-Fi Direct connection with the second terminal.

The Wi-Fi Direct configuration information of the new group to be created further includes an address of the MAC entity selected by the first terminal from the second terminal, and the Wi-Fi Direct configuration information of the new group to be created does not conflict with Wi-Fi Direct configuration information of the existing group to which the second terminal belongs. Specifically, when setting the Wi-Fi Direct configuration information of the new group to be created, the first terminal may use a part or all of the Wi-Fi Direct configuration information of the first terminal, or may also not use the Wi-Fi Direct configuration information of the first terminal but set new Wi-Fi Direct configuration information for the new group to be created. The present invention does not limit a manner of setting, by the first terminal, the Wi-Fi Direct configuration information of the new group to be created, as long as the Wi-Fi Direct configuration information of the new group to be created does not conflict with the Wi-Fi Direct configuration information of the existing group to which the second terminal belongs.

In still another specific implementation manner of this implementation manner, the establishing, by the first terminal, a Wi-Fi Direct connection with the second terminal according to Wi-Fi Direct configuration information of a new group to be created may be: determining, by the first terminal according to a default setting of the first terminal, that the first terminal requests to create a new group with the second terminal; if the first terminal determines that the second terminal includes at least one unused MAC entity, setting, by the first terminal, the Wi-Fi Direct configuration information of the new group to be created, where the Wi-Fi Direct configuration information of the new group to be created does not conflict with Wi-Fi Direct configuration information of the existing group to which the second terminal belongs; and then sending, by the first terminal, the Wi-Fi Direct configuration information of the new group to be created to the second terminal through the NFC connection, so that the second terminal selects one from unused MAC entities in the second terminal and establishes, according to the Wi-Fi Direct configuration information of the new group to be created, a Wi-Fi Direct connection with the first terminal. Specifically, when setting the Wi-Fi Direct configuration information of the new group to be created, the first terminal may use a part or all of the Wi-Fi Direct configuration information of the first terminal, or may also not use the Wi-Fi Direct configuration information of the first terminal but set new Wi-Fi Direct configuration information for the new group to be created. The present invention does not limit a manner of setting, by the first terminal, the Wi-Fi Direct configuration information of the new group to be created, as long as the Wi-Fi Direct configuration information of the new group to be created does not conflict with the Wi-Fi Direct configuration information of the existing group to which the second terminal belongs.

In still another specific implementation manner of this implementation manner, the establishing, by the first terminal, a Wi-Fi Direct connection with the second terminal according to Wi-Fi Direct configuration information of a new group to be created may be: determining, by the first terminal according to a default setting of the first terminal, that the first terminal requests to create a new group with the second terminal; and if the first terminal determines that all MAC entities in the second terminal are used, sending, by the first terminal, the second terminal an indication that the first terminal requests to create a new group with the second terminal, so that the second terminal prompts a user using the second terminal whether to quit the existing group to which the second terminal belongs, and quits, after the user using the second terminal selects to quit the existing group to which the second terminal belongs, the existing group to which the second terminal belongs, sets, according to the Wi-Fi Direct configuration information of the first terminal and the Wi-Fi Direct configuration information of the second terminal, the Wi-Fi Direct configuration information of the new group to be created, and establishes, according to the Wi-Fi Direct configuration information of the new group to be created, a Wi-Fi Direct connection with the first terminal.

In still another implementation manner of this embodiment, determining, by the first terminal according to the group information of the first terminal and the group information of the second terminal, that at least one of the first terminal and the second terminal is a member of an existing group may be: determining, by the first terminal according to the group information of the first terminal and the group information of the second terminal, that both the first terminal and the second terminal are members of an existing group.

In a specific implementation manner of this implementation manner, the establishing, by the first terminal, a Wi-Fi Direct connection with the second terminal according to Wi-Fi Direct configuration information of a new group to be created may be: if the first terminal determines, according to the Wi-Fi Direct configuration information of the first terminal and the Wi-Fi Direct configuration information of the second terminal, that the first terminal and the second terminal do not belong to a same group and that both the first terminal and the second terminal include at least one unused MAC entity, and the first terminal determines, according to the group information of the first terminal and the group information of the second terminal, that at least one of the first terminal and the second terminal is a group owner, selecting, by the first terminal, one from unused MAC entities in the first terminal as a MAC entity to be used by the first terminal in the new group to be created, and selecting one from unused MAC entities in the second terminal; and then setting the Wi-Fi Direct configuration information of the new group to be created, where the Wi-Fi Direct configuration information of the new group to be created may further include an address of the MAC entity selected by the first terminal from the second terminal; and finally, sending, by the first terminal, the Wi-Fi Direct configuration information of the new group to be created to the second terminal through the NFC connection, and establishing, according to the Wi-Fi Direct configuration information of the new group to be created, a Wi-Fi Direct connection with the second terminal.

In this embodiment, if only one of the first terminal and the second terminal is a group owner in the existing group, the terminal being a group owner in the existing group must be a client in the new group, and a value of the group owner intent of the terminal must be set to be smaller than a value of the group owner intent of the peer end in the Wi-Fi Direct configuration information of the new group; if both the first terminal and the second terminal are group owners in the existing group, group owner intents of the two terminals in the Wi-Fi Direct configuration information of the new group may be set at random, as long as values of the group owner intents of the two terminals are set to be different.

In another specific implementation manner of this implementation manner, the establishing, by the first terminal, a Wi-Fi Direct connection with the second terminal according to Wi-Fi Direct configuration information of the existing group or a new group to be created may be: if the first terminal determines, according to the Wi-Fi Direct configuration information of the first terminal and the Wi-Fi Direct configuration information of the second terminal, that the first terminal and the second terminal do not belong to a same group, and the first terminal determines, according to the group information of the first terminal and the group information of the second terminal, that neither the first terminal nor the second terminal is a group owner, or if the first terminal determines, according to the Wi-Fi Direct configuration information of the first terminal and the Wi-Fi Direct configuration information of the second terminal, that the first terminal and the second terminal do not belong to a same group and that all MAC entities in the first terminal and/or the second terminal are used, prompting, by the first terminal, a user using the first terminal whether to quit the existing group to which the first terminal belongs, and instructing the second terminal to prompt a user using the second terminal whether to quit the existing group to which the second terminal belongs; and after the user using the first terminal selects to quit the existing group to which the first terminal belongs, and/or the user using the second terminal selects to quit the existing group to which the second terminal belongs, establishing, by the first terminal, a Wi-Fi Direct connection with the second terminal according to Wi-Fi Direct configuration information of a terminal that does not quit the existing group to which the terminal belongs or the Wi-Fi Direct configuration information of the new group to be created.

If the first terminal or the second terminal not only reserves an original connection but also establishes a new connection, the terminal cannot be used as a client in both of the two groups. Specifically, if the terminal is used as a client in the original connection, the terminal must be used as a group owner in the new connection; if the terminal is used as a group owner in the original connection, the terminal can be used as a group owner or a client in the new group.

Specifically, in another embodiment, step 101 in which a first terminal exchanges Wi-Fi Direct configuration information with a second terminal through an NFC connection between the first terminal and the second terminal, may be: sending, by the first terminal, Wi-Fi Direct configuration information of the first terminal to the second terminal through the NFC connection between the first terminal and the second terminal, where the Wi-Fi Direct configuration information of the first terminal includes group information of the first terminal.

Step 102 in which a Wi-Fi Direct connection is established between the first terminal and the second terminal according to the exchanged Wi-Fi Direct configuration information, may be: if neither the first terminal nor the second terminal is a member of an existing group, establishing, by the first terminal, a Wi-Fi Direct connection with the second terminal according to the Wi-Fi Direct configuration information of the first terminal and Wi-Fi Direct configuration information of the second terminal; or if at least one of the first terminal and the second terminal is a member of an existing group, establishing, by the first terminal, a Wi-Fi Direct connection with the second terminal according to Wi-Fi Direct configuration information of the existing group or a new group to be created.

It should be noted that the establishing, by the first terminal, a Wi-Fi Direct connection with the second terminal means that the first terminal creates a new group with the second terminal.

In this case, the Wi-Fi Direct configuration information of the first terminal may further include: a group owner intent of the first terminal, the number of MAC entities in the first terminal, and an address of each MAC entity; a value of the group information of the first terminal may be: the first terminal being not a member of an existing group, or the first terminal being a group owner of an existing group to which the first terminal belongs, or the first terminal being a client of an existing group to which the first terminal belongs;

the Wi-Fi Direct configuration information of the second terminal may include: the group information of the second terminal, a group owner intent of the second terminal, the number of MAC entities in the second terminal, and an address of each MAC entity; a value of the group information of the second terminal may be: the second terminal being not a member of an existing group, or the second terminal being a group owner of an existing group to which the second terminal belongs, or the second terminal being a client of an existing group to which the second terminal belongs; and the Wi-Fi Direct configuration information of the new group to be created includes an identifier of the new group to be created, a BSSID of the new group to be created, an operating channel of the new group to be created, the group owner intent of the second terminal, an IP base address of the new group to be created, and an address of a MAC entity used by the second terminal in the new group to be created.

In an implementation manner of this embodiment, if neither the first terminal nor the second terminal is a member of an existing group, the establishing, by the first terminal, a Wi-Fi Direct connection with the second terminal according to the Wi-Fi Direct configuration information of the first terminal and Wi-Fi Direct configuration information of the second terminal may be: receiving, by the first terminal, the Wi-Fi Direct configuration information of the new group to be created, which is sent by the second terminal through the NFC connection, where the Wi-Fi Direct configuration information of the new group to be created is set, according to the Wi-Fi Direct configuration information of the first terminal and the Wi-Fi Direct configuration information of the second terminal, and sent by the second terminal to the first terminal; and then establishing, by the first terminal, a Wi-Fi Direct connection with the second terminal according to the Wi-Fi Direct configuration information of the new group to be created.

In another implementation manner of this embodiment, if at least one of the first terminal and the second terminal is a member of an existing group, further, the first terminal further sends a default setting of the first terminal to the second terminal through the NFC connection. The default setting of the first terminal may be included in the Wi-Fi Direct configuration information of the first terminal and sent to the second terminal; or the default setting of the first terminal may also not be included in the Wi-Fi Direct configuration information of the first terminal but is sent to the second terminal along with the Wi-Fi Direct configuration information of the first terminal. The default setting of the first terminal may be that the first terminal requests to join the existing group to which the second terminal belongs or that the first terminal requests to create a new group with the second terminal.

In a specific implementation manner of this implementation manner, the establishing, by the first terminal, a Wi-Fi Direct connection with the second terminal according to Wi-Fi Direct configuration information of the existing group may be: when the first terminal is not a member of the existing group and the second terminal is a member of the existing group, receiving, by the first terminal, the Wi-Fi Direct configuration information of the existing group to which the second terminal belongs, which is sent by the second terminal through the NFC connection, where the Wi-Fi Direct configuration information of the existing group is sent by the second terminal to the first terminal after the second terminal determines, according to the default setting of the first terminal, that the first terminal requests to join the existing group to which the second terminal belongs, and the second terminal determines, according to the group information of the second terminal, that the second terminal is a group owner of the existing group to which the second terminal belongs; then setting, by the first terminal, a value of the group owner intent in the Wi-Fi Direct configuration information of the first terminal to a value smaller than a value of the group owner intent in the Wi-Fi Direct configuration information of the second terminal according to the Wi-Fi Direct configuration information of the existing group, so that the first terminal, used as a client, joins the existing group to which the second terminal belongs; and finally, establishing, by the first terminal, a Wi-Fi Direct connection with the second terminal according to the Wi-Fi Direct configuration information of the existing group.

In another specific implementation manner of this implementation manner, the establishing, by the first terminal, a Wi-Fi Direct connection with the second terminal according to Wi-Fi Direct configuration information of the existing group may be: when the first terminal is not a member of the existing group and the second terminal is a member of the existing group, receiving, by the first terminal, configuration information except encryption information in Wi-Fi Direct configuration information of the existing group to which the second terminal belongs and description information of a group owner of the existing group, which are sent by the second terminal through the NFC connection, where the configuration information except the encryption information in the Wi-Fi Direct configuration information of the existing group to which the second terminal belongs and the description information of the group owner of the existing group are sent by the second terminal to the first terminal after the second terminal determines, according to the default setting of the first terminal, that the first terminal requests to join the existing group to which the second terminal belongs, and the second terminal determines, according to the group information of the second terminal, that the second terminal is a client of the existing group to which the second terminal belongs; then requesting, by the first terminal, the group owner for the encryption information in the Wi-Fi Direct configuration information of the existing group according to the description information of the group owner, and receiving the encryption information in the Wi-Fi Direct configuration information of the existing group sent by the group owner; and finally, establishing, by the first terminal, a Wi-Fi Direct connection with the second terminal according to the Wi-Fi Direct configuration information of the existing group.

In still another specific implementation manner of this implementation manner, the establishing, by the first terminal, a Wi-Fi Direct connection with the second terminal according to Wi-Fi Direct configuration information of a new group to be created may be: when the first terminal is not a member of the existing group and the second terminal is a member of the existing group, receiving, by the first terminal, the Wi-Fi Direct configuration information of the new group to be created, which is sent by the second terminal through the NFC connection, and establishing, according to the Wi-Fi Direct configuration information of the new group to be created, a Wi-Fi Direct connection with the second terminal; where the Wi-Fi Direct configuration information of the new group to be created is sent by the second terminal to the first terminal after the second terminal selects one from unused MAC entities in the second terminal as a MAC entity to be used by the second terminal in the new group to be created and sets the Wi-Fi Direct configuration information of the new group to be created, when the second terminal determines, according to the default setting of the first terminal, that the first terminal requests to create a new group with the second terminal, and the second terminal determines that the second terminal includes at least one unused MAC entity; and the Wi-Fi Direct configuration information of the new group to be created does not conflict with Wi-Fi Direct configuration information of the existing group to which the second terminal belongs, and the Wi-Fi Direct configuration information of the new group to be created further includes the group information of the second terminal.

In still another specific implementation manner of this implementation manner, the establishing, by the first terminal, a Wi-Fi Direct connection with the second terminal according to Wi-Fi Direct configuration information of a new group to be created may be: when the first terminal is not a member of the existing group and the second terminal is a member of the existing group, receiving, by the first terminal, the Wi-Fi Direct configuration information of the new group to be created, which is sent by the second terminal through the NFC connection; then establishing, by the first terminal, a Wi-Fi Direct connection with the second terminal according to the Wi-Fi Direct configuration information of the new group to be created; where the Wi-Fi Direct configuration information of the new group to be created is sent by the second terminal to the first terminal after the second terminal quits the existing group to which the second terminal belongs and sets, according to the Wi-Fi Direct configuration information of the first terminal and the Wi-Fi Direct configuration information of the second terminal, the Wi-Fi Direct configuration information of the new group to be created, if a user using the second terminal selects to quit the existing group to which the second terminal belongs when the second terminal prompts the user using the second terminal whether to quit the existing group to which the second terminal belongs, when the second terminal determines, according to the default setting of the first terminal, that the first terminal requests to create a new group with the second terminal, and the second terminal determines that all MAC entities in the second terminal are used; and a value of the group owner intent of the second terminal is different from a value of the group owner intent of the first terminal in the Wi-Fi Direct configuration information of the new group to be created.

In still another implementation manner of this embodiment, the establishing, by the first terminal, a Wi-Fi Direct connection with the second terminal according to Wi-Fi Direct configuration information of the existing group may be: when the first terminal is a member of the existing group and the second terminal is not a member of the existing group, if the second terminal determines, according to a default setting of the second terminal, that the second terminal requests to join the existing group to which the first terminal belongs, and the second terminal determines, according to the group information of the first terminal, that the first terminal is a group owner of the existing group to which the first terminal belongs, establishing, by the first terminal, a Wi-Fi Direct connection with the second terminal according to the Wi-Fi Direct configuration information of the first terminal after the second terminal sets a value of the group owner intent in the Wi-Fi Direct configuration information of the second terminal to a value smaller than a value of the group owner intent in the Wi-Fi Direct configuration information of the first terminal; and in this case, the Wi-Fi Direct configuration information of the first terminal is Wi-Fi Direct configuration information of the existing group to which the first terminal belongs.

In still another implementation manner of this embodiment, when the first terminal is a member of the existing group and the second terminal is not a member of the existing group, and the first terminal is a client of the existing group to which the first terminal belongs, the Wi-Fi Direct configuration information of the first terminal sent by the first terminal is configuration information except encryption information in Wi-Fi Direct configuration information of the existing group to which the first terminal belongs; and in this case, the first terminal further sends description information of a group owner of the existing group to which the first terminal belongs, to the second terminal through the NFC connection. Specifically, the description information of the group owner of the existing group to which the first terminal belongs may be included in the Wi-Fi Direct configuration information of the first terminal; or the description information of the group owner of the existing group to which the first terminal belongs may also not be included in the Wi-Fi Direct configuration information of the first terminal but is sent to the second terminal along with the Wi-Fi Direct configuration information of the first terminal.

In still another implementation manner of this embodiment, when the first terminal is a member of the existing group and the second terminal is not a member of the existing group, the establishing, by the first terminal, a Wi-Fi Direct connection with the second terminal according to Wi-Fi Direct configuration information of a new group to be created may be: receiving, by the first terminal, the Wi-Fi Direct configuration information of the new group to be created, which is sent by the second terminal through the NFC connection, and establishing, according to the Wi-Fi Direct configuration information of the new group to be created, a Wi-Fi Direct connection with the second terminal; where the Wi-Fi Direct configuration information of the new group to be created is sent by the second terminal to the first terminal after the second terminal selects one from unused MAC entities in the first terminal and sets the Wi-Fi Direct configuration information of the new group to be created, after the second terminal determines, according to a default setting of the second terminal, that the second terminal requests to create a new group with the first terminal, and the second terminal determines that the first terminal includes at least one unused MAC entity; and the Wi-Fi Direct configuration information of the new group to be created further includes an address of the MAC entity selected by the second terminal from the first terminal, and the Wi-Fi Direct configuration information of the new group to be created does not conflict with Wi-Fi Direct configuration information of the existing group to which the first terminal belongs.

In still another implementation manner of this embodiment, when the first terminal is a member of the existing group and the second terminal is not a member of the existing group, the establishing, by the first terminal, a Wi-Fi Direct connection with the second terminal according to Wi-Fi Direct configuration information of a new group to be created may be: receiving, by the first terminal, the Wi-Fi Direct configuration information of the new group to be created, which is sent by the second terminal through the NFC connection, where the Wi-Fi Direct configuration information of the new group to be created that is sent by the second terminal is set and sent by the second terminal to the first terminal after the second terminal determines, according to a default setting of the second terminal, that the second terminal requests to create a new group with the first terminal, and determines that the first terminal includes at least one unused MAC entity, and the Wi-Fi Direct configuration information of the new group to be created does not conflict with Wi-Fi Direct configuration information of the existing group to which the first terminal belongs; and then selecting, by the first terminal, one from unused MAC entities in the first terminal, and establishing, according to the Wi-Fi Direct configuration information of the new group to be created, a Wi-Fi Direct connection with the second terminal.

In still another implementation manner of this embodiment, when the first terminal is a member of the existing group and the second terminal is not a member of the existing group, the establishing, by the first terminal, a Wi-Fi Direct connection with the second terminal according to Wi-Fi Direct configuration information of a new group to be created may be: receiving, by the first terminal, an indication sent by the second terminal that the second terminal requests to create a new group with the first terminal, where the indication is sent by the second terminal to the first terminal after the second terminal determines, according to a default setting of the second terminal, that the second terminal requests to create a new group with the first terminal, and determines that all MAC entities in the first terminal are used; and then prompting, by the first terminal, a user using the first terminal whether to quit the existing group to which the first terminal belongs, and quitting the existing group to which the first terminal belongs after the user using the first terminal selects to quit the existing group to which the first terminal belongs, setting, according to the Wi-Fi Direct configuration information of the first terminal and the Wi-Fi Direct configuration information of the second terminal, the Wi-Fi Direct configuration information of the new group to be created, and establishing, according to the Wi-Fi Direct configuration information of the new group to be created, a Wi-Fi Direct connection with the second terminal.

In still another implementation manner of this embodiment, when both the first terminal and the second terminal are members of an existing group, the establishing, by the first terminal, a Wi-Fi Direct connection with the second terminal according to Wi-Fi Direct configuration information of a new group to be created may be: receiving, by the first terminal, the Wi-Fi Direct configuration information of the new group to be created, which is sent by the second terminal through the NFC connection, and establishing, according to the Wi-Fi Direct configuration information of the new group to be created, a Wi-Fi Direct connection with the second terminal; where the Wi-Fi Direct configuration information of the new group to be created is sent by the second terminal to the first terminal after the second terminal selects one from unused MAC entities in the second terminal as a MAC entity to be used by the second terminal in the new group to be created, selects one from unused MAC entities in the first terminal, and sets the Wi-Fi Direct configuration information of the new group to be created, when the second terminal determines, according to the Wi-Fi Direct configuration information of the first terminal and the Wi-Fi Direct configuration information of the second terminal, that the first terminal and the second terminal do not belong to a same group and that both the first terminal and the second terminal include at least one unused MAC entity, and the second terminal determines, according to the group information of the first terminal and the group information of the second terminal, that at least one of the first terminal and the second terminal is a group owner; and the Wi-Fi Direct configuration information of the new group to be created further includes an address of the MAC entity selected by the second terminal from the first terminal.

In this embodiment, if only one of the first terminal and the second terminal is a group owner, the terminal being a group owner in the existing group must be a client in the new group, and the group owner intent of the terminal must be set to be smaller than the group owner intent of the peer end in the Wi-Fi Direct configuration information of the new group; if both the first terminal and the second terminal are group owners in the existing group, group owner intents of the two terminals in the configuration information of the new group may be set at random, as long as values of the group owner intents of the two terminals are set to be different.

In the foregoing embodiment, the first terminal and the second terminal exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client of a Wi-Fi Direct group cannot actively discover a GO or a client of another group. In this scenario, a Wi-Fi Direct connection cannot be established by using radio signaling, but this restriction does not exist when the technical solution provided by this embodiment is used. As long as the first terminal and the second terminal are within an NFC communication range, the first terminal and the second terminal can exchange configuration information, and both can establish a Wi-Fi Direct connection between the first terminal and the second terminal.

Figure 2:
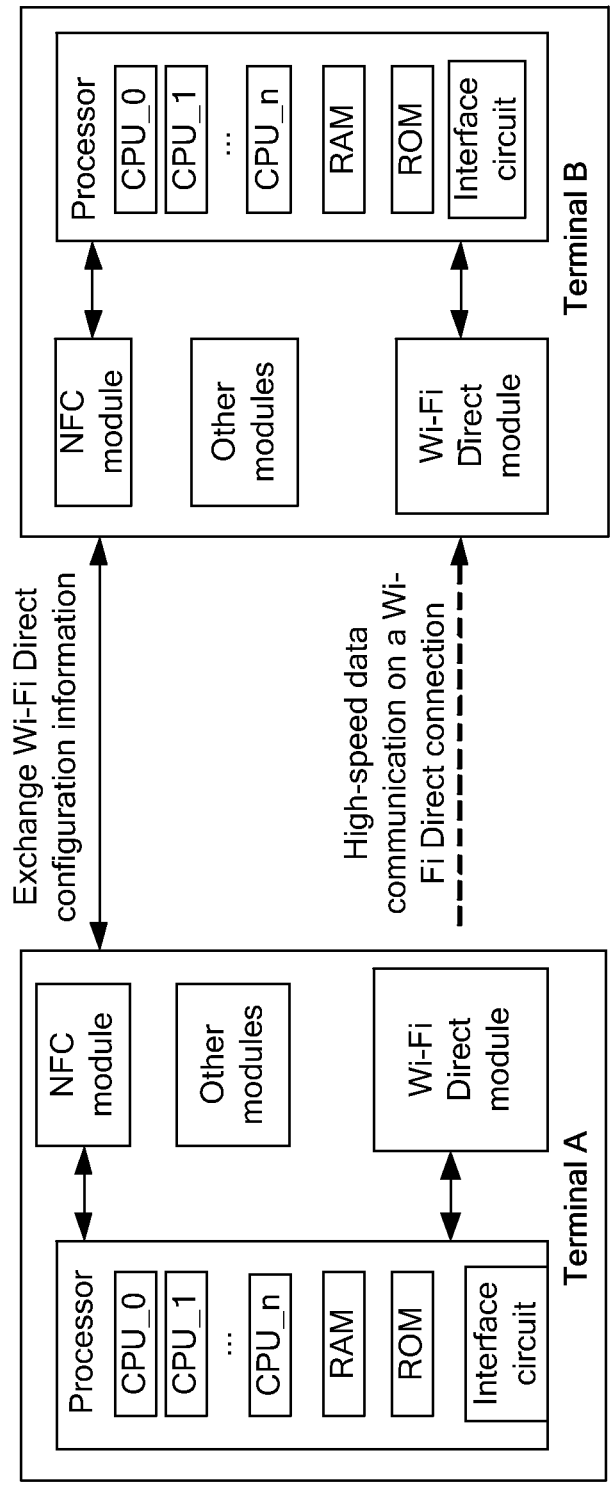
FIG. 2 is a schematic diagram of an embodiment of an application scenario according to the present invention.

In the method for establishing a communication connection according to the present invention, a Wi-Fi Direct connection is established by using an NFC connection handover. Two terminals using the method provided by the present invention to establish a Wi-Fi Direct connection both need to support the NFC and Wi-Fi Direct functions. As shown in FIG. 2, terminal A and terminal B separately read their own Wi-Fi Direct configuration information, then exchange Wi-Fi Direct configuration information with the peer end, with which a connection is established, in a touch manner through an NFC interface, and establish a Wi-Fi Direct connection according to the method provided by the present invention. FIG. 2 is a schematic diagram of an embodiment of an application scenario according to the present invention.

In FIG. 2, Wi-Fi Direct configuration information exchanged between terminal A and terminal B includes the following content:

(1) ID of a Wi-Fi P2P group (Wi-Fi P2P, namely, Wi-Fi Direct);

(2) BSSID of the Wi-Fi P2P group;

(3) channel list (Channel list);

(4) operating channel of an existing group (Operating Channel; if neither of the two terminals joins the existing group, the content is filled with an agreed null value);

(5) authentication information (authentication, which may be WPS authentication information or other authentication information);

(6) encryption information (encryption, which may be WPS encryption information or other encryption information);

(7) the number of MAC entities, and an address of each MAC entity (the number of MAC entities that a terminal has and the address of each MAC entity);

(8) group owner intent (GO Intent);

(9) group information, a value of which may be that the terminal is not in an existing group, or that the terminal is a group owner in an existing group, or that the terminal is a client in an existing group;

(10) IP base address (to avoid an IP address conflict between two groups when a terminal acts as a member of the two groups);

(11) other content that is defined by the Wi-Fi Direct protocol and may be exchanged by using a radio signal frame; and

(12) default setting option, indicating whether the terminal requests to join the existing group or requests to create a new group; this option is optional.

Figure 3:
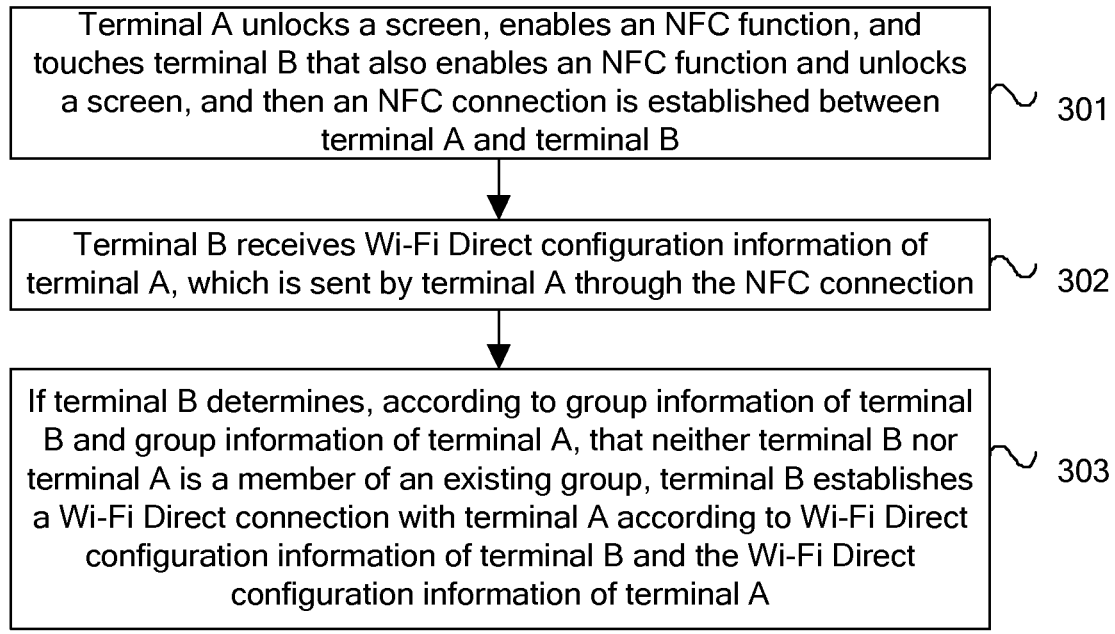
FIG. 3 is a flowchart of another embodiment of a method for establishing a communication connection according to the present invention.

FIG. 3 is a flowchart of another embodiment of a method for establishing a communication connection according to the present invention. As shown in FIG. 3, the method for establishing a communication connection may include:

Step 301: Terminal A unlocks a screen, enables an NFC function, and touches terminal B that also enables an NFC function and unlocks a screen, and then an NFC connection is established between terminal A and terminal B.

Step 302: Terminal B receives Wi-Fi Direct configuration information of terminal A, which is sent by terminal A through the NFC connection.

During specific implementation, terminal A and terminal B may use a "handover request collision resolution mechanism" defined in the NFC connection handover protocol to decide Requester and Selector identities. However, this embodiment is described by using that terminal A is a Requester and terminal B is a Selector as an example.

In this embodiment, Wi-Fi Direct configuration information of terminal B includes group information of terminal B, and Wi-Fi Direct configuration information of terminal A includes group information of terminal A.

In this embodiment, the Wi-Fi Direct configuration information of terminal B may further include: a group owner intent of terminal B, the number of MAC entities in terminal B, and an address of each MAC entity; where a value of the group information of terminal B may be: terminal B being not a member of an existing group, or terminal B being a group owner of an existing group to which terminal B belongs, or terminal B being a client of an existing group to which terminal B belongs; and the Wi-Fi Direct configuration information of terminal A may further include: a group owner intent of terminal A, the number of MAC entities in terminal A, and an address of each MAC entity; where a value of the group information of terminal A may be: terminal A being not a member of an existing group, or terminal A being a group owner of an existing group to which terminal A belongs, or terminal A being a client of an existing group to which terminal A belongs.

Step 303: If terminal B determines, according to the group information of terminal B and the group information of terminal A, that neither terminal B nor terminal A is a member of an existing group, terminal B establishes a Wi-Fi Direct connection with terminal A according to the Wi-Fi Direct configuration information of terminal B and the Wi-Fi Direct configuration information of terminal A.

Specifically, terminal B may set, according to the Wi-Fi Direct configuration information of terminal B and the Wi-Fi Direct configuration information of terminal A, Wi-Fi Direct configuration information of a new group to be created, where the Wi-Fi Direct configuration information of the new group to be created includes an identifier of the new group to be created, a BSSID of the new group to be created, an operating channel of the new group to be created, the group owner intent of terminal B, an IP base address of the new group to be created, and an address of a MAC entity used by terminal B in the new group to be created; then, terminal B sends the Wi-Fi Direct configuration information of the new group to be created to terminal B through the NFC connection; and finally, terminal B establishes a Wi-Fi Direct connection with terminal A according to the Wi-Fi Direct configuration information of the new group to be created.

When setting the Wi-Fi Direct configuration information of the new group to be created, for example, when setting an identifier of the new group to be created, terminal B may use a group identifier in the Wi-Fi Direct configuration information of terminal B, or may also use a group identifier in the Wi-Fi Direct configuration information of terminal A, or may neither use a group identifier in the Wi-Fi Direct configuration information of terminal B nor use a group identifier in the Wi-Fi Direct configuration information of terminal A but set a new identifier for the new group to be created. Likewise, the BSSID of the new group to be created, the operating channel of the new group to be created, the IP base address of the new group to be created, and the address of the MAC entity used in the new group to be created may also be set in the preceding manner, that is, corresponding information included in the Wi-Fi Direct configuration information of terminal B or terminal A may be used, or a new value is set. Details are not repeated herein.

In step 302 of this embodiment, sending, by terminal A, the Wi-Fi Direct configuration information of terminal A to terminal B through the NFC connection may be: sending, by terminal A, an NFC connection handover request message to terminal B, where the NFC connection handover request message carries the Wi-Fi Direct configuration information of terminal A.

Figure 4:
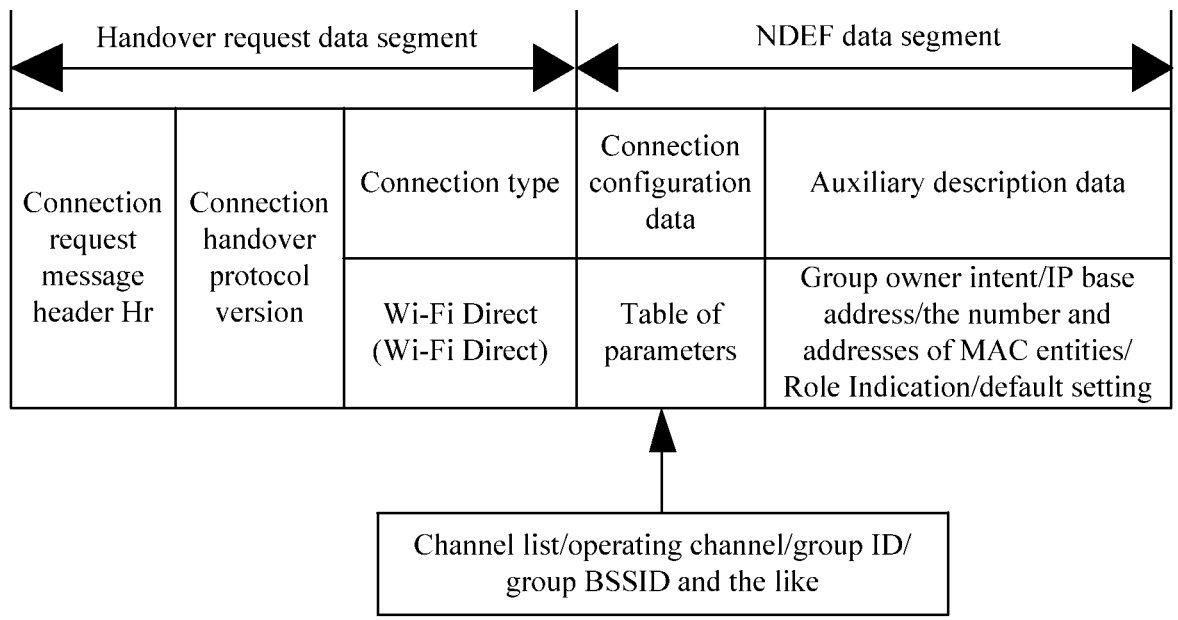
FIG. 4 is a schematic diagram of an embodiment of a format of a connection handover request according to the present invention.
Figure 5:
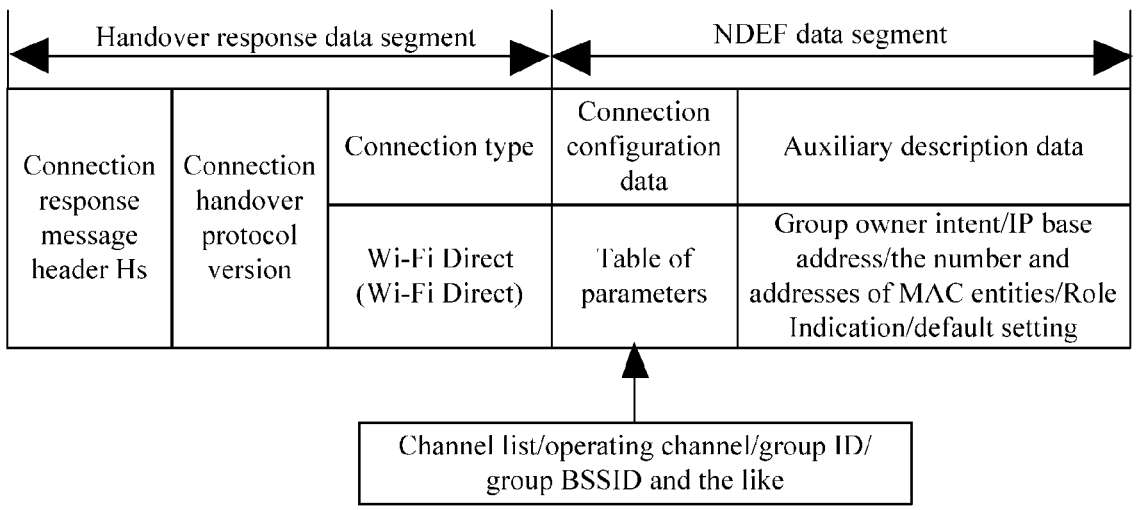
FIG. 5 is a schematic diagram of an embodiment of a format of a connection handover response according to the present invention.
Figure 6A:
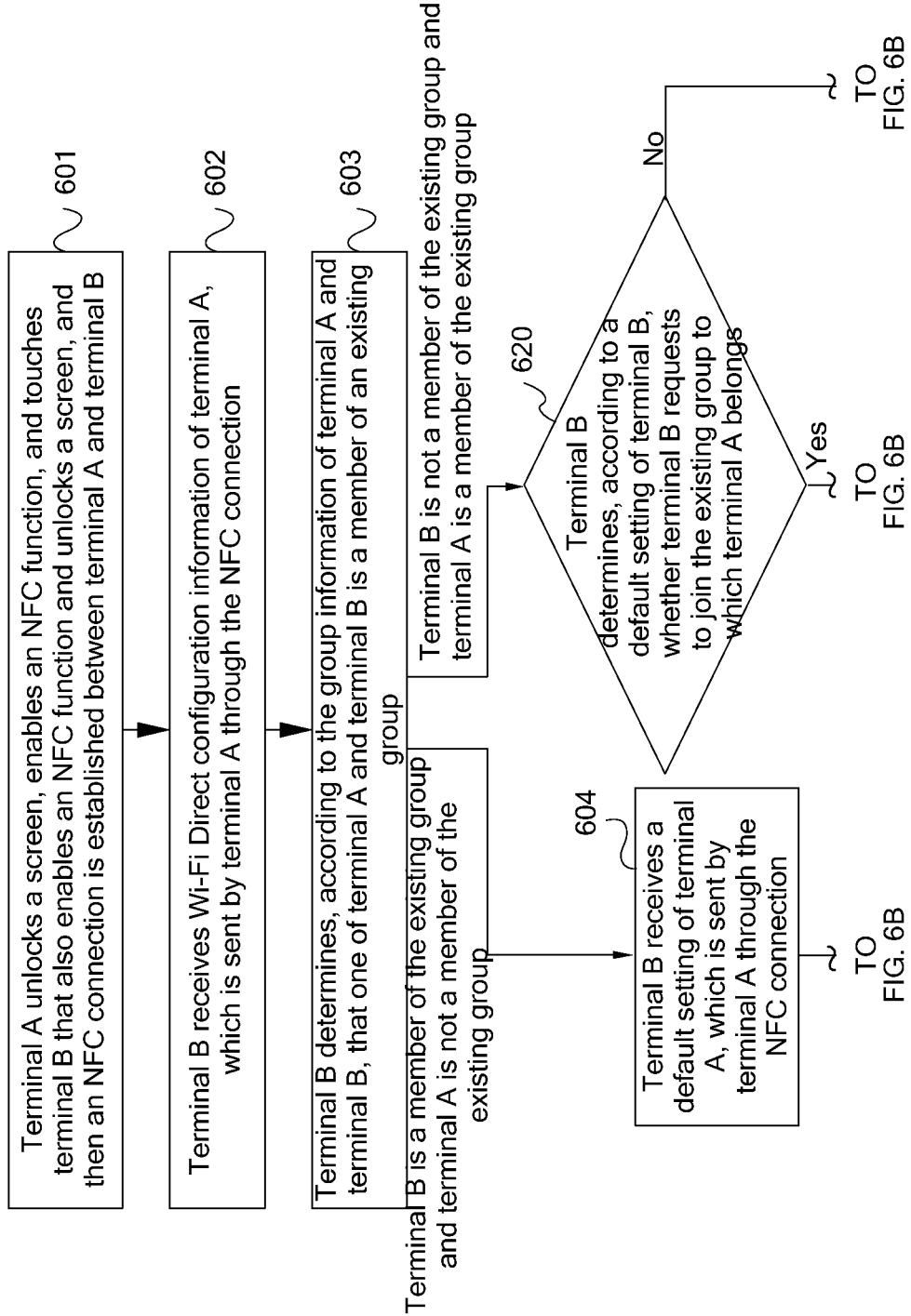
Figure 6B:
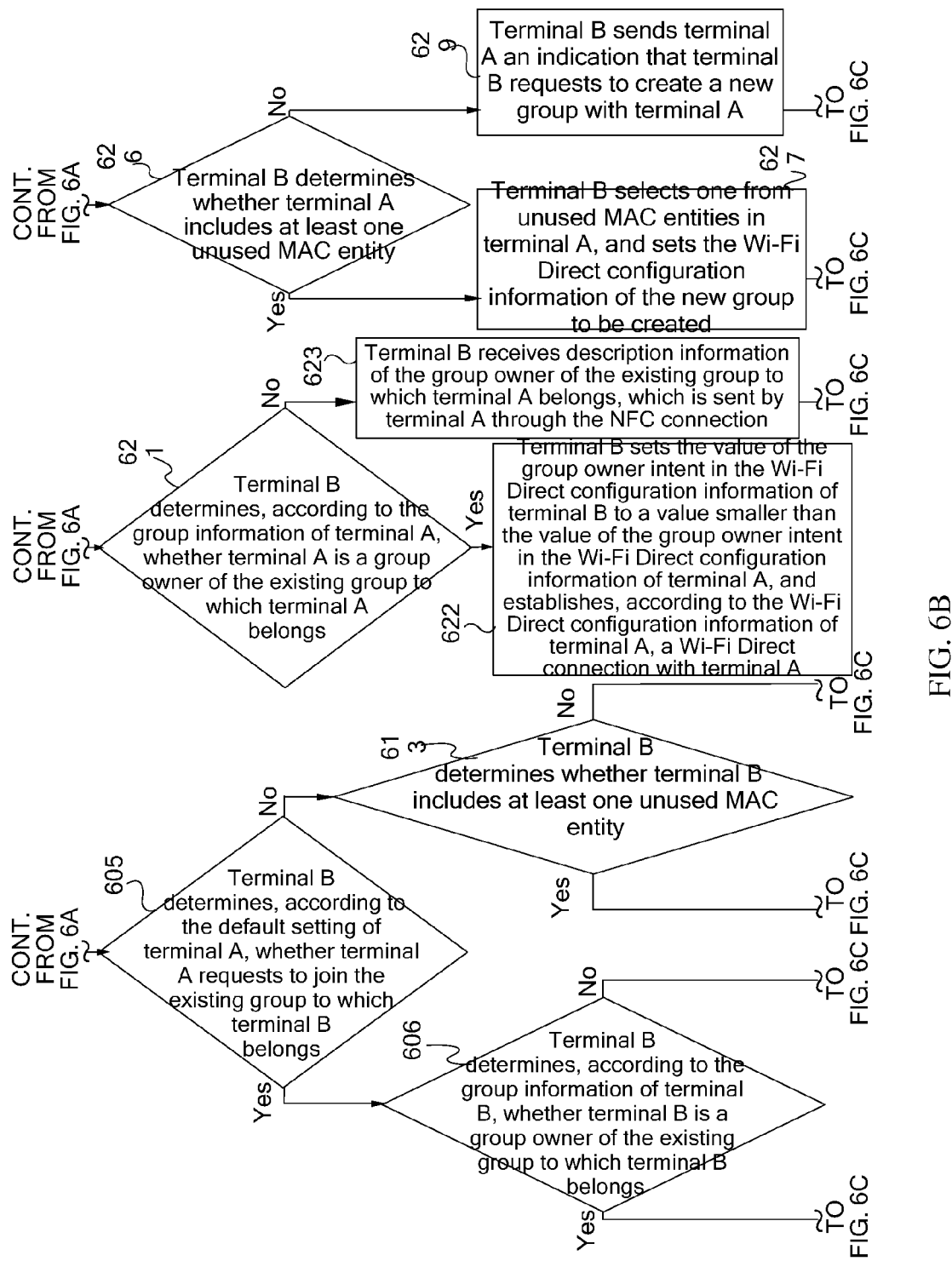
Figure 6D:
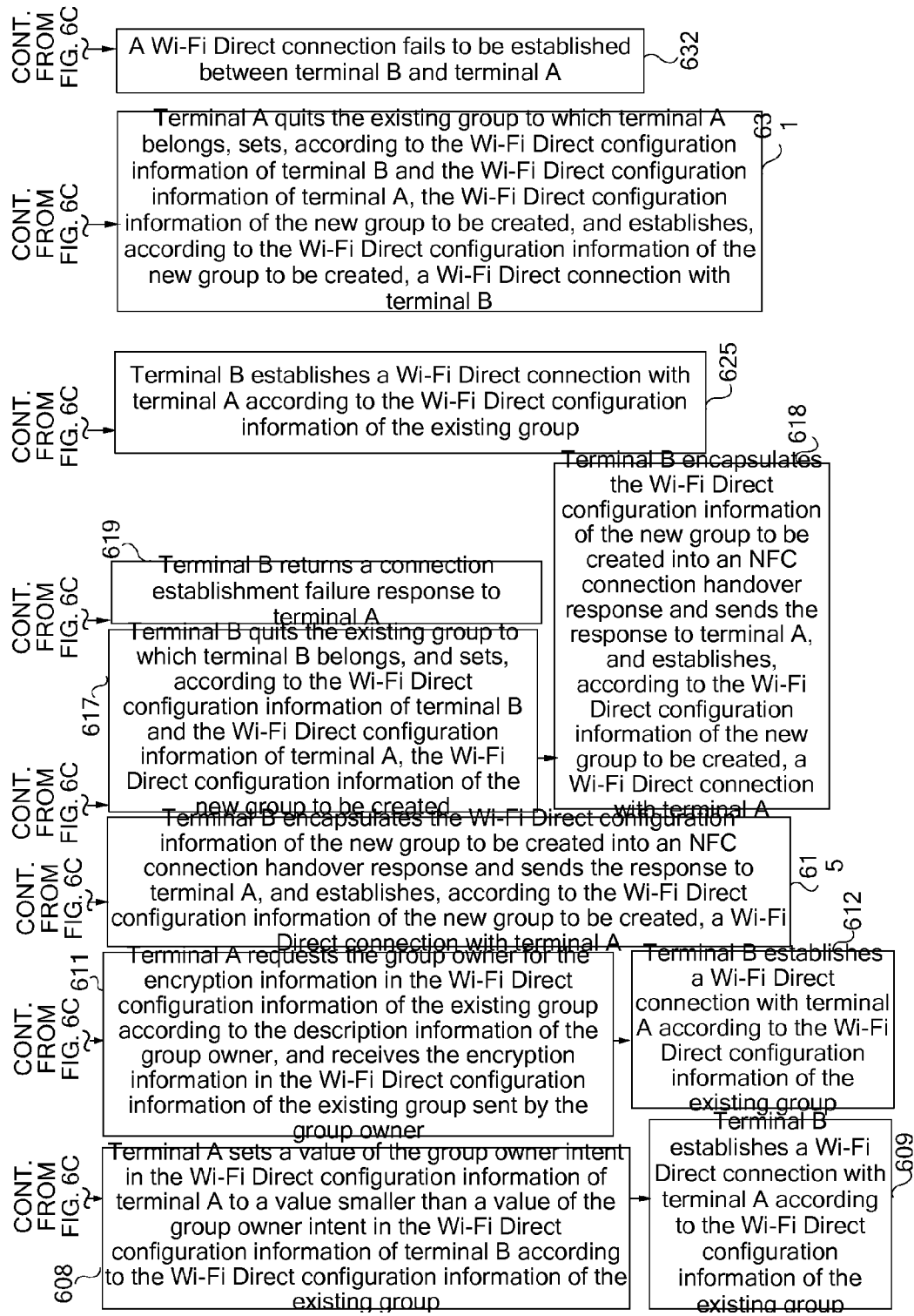

Specifically, an encapsulation format of the NFC connection handover request message may be as shown in FIG. 4. In step 303, an encapsulation format of an NFC connection handover response may be as shown in FIG. 5. FIG. 4 is a schematic diagram of an embodiment of a format of a connection handover request according to the present invention; and FIG. 5 is a schematic diagram of an embodiment of a format of a connection handover response according to the present invention.

In the foregoing message encapsulation format, a part of the Wi-Fi Direct configuration information is placed in connection configuration data, and a part thereof is placed in auxiliary description data. Actually, all of the Wi-Fi Direct configuration information may be placed in the connection configuration data, or may be placed in the auxiliary description data, which is not limited by this embodiment.

In the foregoing embodiment, in addition to exchanging encryption information, terminal B and terminal A need to exchange a series of parameters required for establishing a Wi-Fi Direct connection, such as group information, the number of MAC entities, and the address of each MAC entity, but the parameters can be completely exchanged only after multiple times of exchange by using radio signaling in the prior art. However, in this embodiment, the parameters are included in the Wi-Fi Direct configuration information and are completely exchanged through the NFC connection at a time, so that a process of establishing a Wi-Fi Direct connection is simplified.

FIG. 6A, FIG. 6B, FIG. 6C, and FIG. 6D are a flowchart of still another embodiment of a method for establishing a communication connection according to the present invention. As shown in FIG. 6A, FIG. 6B, FIG. 6C, and FIG. 6D, the method for establishing a communication connection may include:

Step 601: Terminal A unlocks a screen, enables an NFC function, and touches terminal B that also enables an NFC function and unlocks a screen, and then an NFC connection is established between terminal A and terminal B.

Step 602: Terminal B receives Wi-Fi Direct configuration information of terminal A, which is sent by terminal A through the NFC connection.

During specific implementation, terminal A and terminal B may use a "handover request collision resolution mechanism" defined in the NFC connection handover protocol to decide Requester and Selector identities. However, this embodiment is described by using that terminal A is a Requester and terminal B is a Selector as an example.

In this embodiment, Wi-Fi Direct configuration information of terminal B includes group information of terminal B, and the Wi-Fi Direct configuration information of terminal A includes group information of terminal A.

In this embodiment, the Wi-Fi Direct configuration information of terminal B may further include: a group owner intent of terminal B, the number of MAC entities in terminal B, and an address of each MAC entity; where a value of the group information of terminal B may be: terminal B being not a member of an existing group, or terminal B being a group owner of an existing group to which terminal B belongs, or terminal B being a client of an existing group to which terminal B belongs; and the Wi-Fi Direct configuration information of terminal A may further include: a group owner intent of terminal A, the number of MAC entities in terminal A, and an address of each MAC entity; where a value of the group information of terminal A may be: terminal A being not a member of an existing group, or terminal A being a group owner of an existing group to which terminal A belongs, or terminal A being a client of an existing group to which terminal A belongs.

Step 603: Terminal B determines, according to the group information of terminal A and terminal B, that one of terminal A and terminal B is a member of an existing group. If terminal B is a member of the existing group and terminal A is not a member of the existing group, step 604 is performed; if terminal B is not a member of the existing group and terminal A is a member of the existing group, step 620 is performed.

Step 604: Terminal B receives a default setting of terminal A, which is sent by terminal A through the NFC connection.

Specifically, the default setting of terminal A may be included in the Wi-Fi Direct configuration information of terminal A; or the default setting may also not be included in the Wi-Fi Direct configuration information of terminal A but is sent to terminal B along with the Wi-Fi Direct configuration information of terminal A.

The default setting of terminal A reflects that terminal A requests to join the existing group to which terminal B belongs or that terminal A requests to create a new group with terminal B.

Step 605: Terminal B determines, according to the default setting of terminal A, whether terminal A requests to join the existing group to which terminal B belongs; and if terminal A requests to join the existing group to which terminal B belongs, step 606 is performed; or if terminal A does not request to join the existing group to which terminal B belongs, that is, if terminal B determines, according to the default setting of terminal A, that terminal A requests to create a new group with terminal B, step 613 is performed.

Step 606: Terminal B determines, according to the group information of terminal B, whether terminal B is a group owner of the existing group to which terminal B belongs. If terminal B is a group owner of the existing group to which terminal B belongs, step 607 is performed; if terminal B is not a group owner of the existing group to which terminal B belongs but is a client of the existing group, step 610 is performed.

Step 607: Terminal B encapsulates Wi-Fi Direct configuration information of the existing group to which terminal B belongs into an NFC connection handover response and sends the response to terminal A.

Step 608: Terminal A sets a value of the group owner intent in the Wi-Fi Direct configuration information of terminal A to a value smaller than a value of the group owner intent in the Wi-Fi Direct configuration information of terminal B according to the Wi-Fi Direct configuration information of the existing group. In this way, terminal A can be used as a client to join the existing group to which terminal B belongs.

Step 609: Terminal B establishes a Wi-Fi Direct connection with terminal A according to the Wi-Fi Direct configuration information of the existing group.

Step 610: Terminal B encapsulates configuration information except encryption information in the Wi-Fi Direct configuration information of the existing group and description information of the group owner of the existing group into an NFC connection handover response and sends the response to terminal A.

Step 611: Terminal A requests the group owner for the encryption information in the Wi-Fi Direct configuration information of the existing group according to the description information of the group owner, and receives the encryption information in the Wi-Fi Direct configuration information of the existing group sent by the group owner.

Specifically, terminal A may request the group owner for the encryption information in a wireless connection (for example, Wi-Fi) manner, or may also obtain the encryption information by an additional touch (that is, by establishing an NFC connection with the group owner). In this way, terminal A also obtains all Wi-Fi Direct configuration information of the existing group, and then step 612 is performed.

Step 612: Terminal B establishes a Wi-Fi Direct connection with terminal A according to the Wi-Fi Direct configuration information of the existing group.

Step 613: Terminal B determines whether terminal B includes at least one unused MAC entity. If terminal B includes at least one unused MAC entity, step 614 is performed. If terminal B does not include at least one unused MAC entity, that is, if terminal B determines that all MAC entities in terminal B are used, step 616 is performed.

Step 614: Terminal B selects one from unused MAC entities in terminal B as a MAC entity to be used by terminal B in a new group to be created, and sets Wi-Fi Direct configuration information of the new group to be created.

The Wi-Fi Direct configuration information of the new group to be created does not conflict with the Wi-Fi Direct configuration information of the existing group to which terminal B belongs. Specifically, when setting the Wi-Fi Direct configuration information of the new group to be created, terminal B may use a part or all of the Wi-Fi Direct configuration information of terminal A, for example, may use a group ID in the Wi-Fi Direct configuration information of terminal A as an identifier of the new group to be created, and/or use a group BSSID in the Wi-Fi Direct configuration information of terminal A as a BSSID of the new group to be created; or may also not use the Wi-Fi Direct configuration information of terminal A but set new Wi-Fi Direct configuration information for the new group to be created. The present invention does not limit a manner of setting, by terminal B, the Wi-Fi Direct configuration information of the new group to be created, as long as the Wi-Fi Direct configuration information of the new group to be created does not conflict with the Wi-Fi Direct configuration information of the existing group to which terminal B belongs.

In addition, the Wi-Fi Direct configuration information of the new group to be created further includes the group information of terminal A.

Step 615: Terminal B encapsulates the Wi-Fi Direct configuration information of the new group to be created into an NFC connection handover response and sends the response to terminal A, and establishes, according to the Wi-Fi Direct configuration information of the new group to be created, a Wi-Fi Direct connection with terminal A.

Step 616: Terminal B prompts a user using terminal B whether to quit the existing group to which terminal B belongs; and if the user using terminal B selects to quit the existing group to which terminal B belongs, step 617 is performed; or if the user using terminal B selects not to quit the existing group to which terminal B belongs, step 619 is performed.

Step 617: Terminal B quits the existing group to which terminal B belongs, and sets, according to the Wi-Fi Direct configuration information of terminal B and the Wi-Fi Direct configuration information of terminal A, the Wi-Fi Direct configuration information of the new group to be created.

The Wi-Fi Direct configuration information of the new group to be created includes an identifier of the new group to be created, a BSSID of the new group to be created, an operating channel of the new group to be created, the group owner intent of terminal B, an IP base address of the new group to be created, and an address of a MAC entity used by terminal B in the new group to be created.

A value of the group owner intent of terminal B is different from a value of the group owner intent of terminal A in the Wi-Fi Direct configuration information of the new group to be created.

Step 618: Terminal B encapsulates the Wi-Fi Direct configuration information of the new group to be created into an NFC connection handover response and sends the response to terminal A, and establishes, according to the Wi-Fi Direct configuration information of the new group to be created, a Wi-Fi Direct connection with terminal A.

Step 619: Terminal B returns a connection establishment failure response to terminal A.

Step 620: Terminal B determines, according to a default setting of terminal B, whether terminal B requests to join the existing group to which terminal A belongs. If terminal B requests to join the existing group to which terminal A belongs, step 621 is performed; if terminal B determines, according to the default setting of terminal B, that terminal B does not request to join the existing group to which terminal A belongs but requests to create a new group with terminal A, step 626 is performed.

Step 621: Terminal B determines, according to the group information of terminal A, whether terminal A is a group owner of the existing group to which terminal A belongs. If terminal A is a group owner of the existing group to which terminal A belongs, step 622 is performed; if terminal A is not a group owner of the existing group to which terminal A belongs but is a client of the existing group, step 623 is performed.

Step 622: Terminal B sets the value of the group owner intent in the Wi-Fi Direct configuration information of terminal B to a value smaller than the value of the group owner intent in the Wi-Fi Direct configuration information of terminal A, and establishes, according to the Wi-Fi Direct configuration information of terminal A, a Wi-Fi Direct connection with terminal A.

In this step, terminal B sets the value of the group owner intent in the Wi-Fi Direct configuration information of terminal B to a value smaller than the value of the group owner intent in the Wi-Fi Direct configuration information of terminal A. In this way, terminal B can be used as a client of the existing group to which terminal A belongs to join the existing group.

The Wi-Fi Direct configuration information of terminal A is Wi-Fi Direct configuration information of the existing group to which terminal A belongs.

Step 623: Terminal B receives description information of the group owner of the existing group to which terminal A belongs, which is sent by terminal A through the NFC connection.

Specifically, the description information of the group owner of the existing group to which terminal A belongs may be included in the Wi-Fi Direct configuration information of terminal A; or the description information of the group owner of the existing group to which terminal A belongs may also not be included in the Wi-Fi Direct configuration information of terminal A but is sent to terminal B along with the Wi-Fi Direct configuration information of terminal A.

In this case, the Wi-Fi Direct configuration information of terminal A is configuration information except encryption information in the Wi-Fi Direct configuration information of the existing group to which terminal A belongs.

In this embodiment, the description information of the group owner of the existing group to which terminal A belongs may be sent along with the Wi-Fi Direct configuration information of terminal A, or may also be sent separately, which is not limited by this embodiment. That is, when terminal A is a client of the existing group to which terminal A belongs, terminal A may send the Wi-Fi Direct configuration information of terminal A with the description information of the group owner of the existing group to which terminal A belongs, to terminal B through the NFC connection in step 602, for example, encapsulate the two pieces of information into an NFC connection handover request and send the request to terminal B; or terminal A may also first add the Wi-Fi Direct configuration information of terminal A into an NFC connection handover request and send the request to terminal B in step 602, and then carry the description information of the group owner of the existing group to which terminal A belongs into an NFC connection handover request or another message and send the message to terminal B through the NFC connection in step 623.

Step 624: Terminal B requests, according to the description information of the group owner of the existing group to which terminal A belongs, the group owner for the encryption information in the Wi-Fi Direct configuration information of the existing group to which terminal A belongs, and receives the encryption information in the Wi-Fi Direct configuration information of the existing group sent by the group owner.

Specifically, terminal B may request the group owner for the encryption information in a wireless connection manner, or may also obtain the encryption information by an additional touch (that is, by establishing an NFC connection with the group owner). In this way, terminal B also obtains all Wi-Fi Direct configuration information of the existing group, and then step 625 is performed.

Step 625: Terminal B establishes a Wi-Fi Direct connection with terminal A according to the Wi-Fi Direct configuration information of the existing group.

Step 626: Terminal B determines whether terminal A includes at least one unused MAC entity. If terminal A includes at least one unused MAC entity, step 627 is performed. If terminal A does not include at least one unused MAC entity, that is, if terminal B determines that all MAC entities in terminal A are used, step 629 is performed.

Step 627: Terminal B selects one from unused MAC entities in terminal A, and sets the Wi-Fi Direct configuration information of the new group to be created.

The Wi-Fi Direct configuration information of the new group to be created further include an address of the MAC entity selected by terminal B from terminal A, and the Wi-Fi Direct configuration information of the new group to be created does not conflict with the Wi-Fi Direct configuration information of the existing group to which terminal A belongs. Specifically, when setting the Wi-Fi Direct configuration information of the new group to be created, terminal B may use a part or all of the Wi-Fi Direct configuration information of terminal B, for example, may use a group ID in the Wi-Fi Direct configuration information of terminal B as an identifier of the new group to be created, and/or use a group BSSID in the Wi-Fi Direct configuration information of terminal B as a BSSID of the new group to be created; or may also not use the Wi-Fi Direct configuration information of terminal B but set new Wi-Fi Direct configuration information for the new group to be created. The present invention does not limit a manner of setting, by terminal B, the Wi-Fi Direct configuration information of the new group to be created, as long as the Wi-Fi Direct configuration information of the new group to be created does not conflict with the Wi-Fi Direct configuration information of the existing group to which terminal A belongs.

Step 628: Terminal B encapsulates the Wi-Fi Direct configuration information of the new group to be created into an NFC connection handover response and sends the response to terminal A, and establishes, according to the Wi-Fi Direct configuration information of the new group to be created, a Wi-Fi Direct connection with terminal A.

In another implementation manner of this embodiment, step 627 and step 628 may also be as follows: Terminal B sets the Wi-Fi Direct configuration information of the new group to be created, where the Wi-Fi Direct configuration information of the new group to be created does not conflict with the Wi-Fi Direct configuration information of the existing group to which terminal A belongs; then terminal B sends the Wi-Fi Direct configuration information of the new group to be created to terminal A through the NFC connection. Then, terminal A selects one from unused MAC entities in terminal A and establishes, according to the Wi-Fi Direct configuration information of the new group to be created, a Wi-Fi Direct connection with terminal B. When setting the Wi-Fi Direct configuration information of the new group to be created, terminal B may use a part or all of the Wi-Fi Direct configuration information of terminal B, for example, may use a group ID in the Wi-Fi Direct configuration information of terminal B as an identifier of the new group to be created, and/or use a group BSSID in the Wi-Fi Direct configuration information of terminal B as a BSSID of the new group to be created; or may also not use the Wi-Fi Direct configuration information of terminal B but set new Wi-Fi Direct configuration information for the new group to be created. The present invention does not limit a manner of setting, by terminal B, the Wi-Fi Direct configuration information of the new group to be created, as long as the Wi-Fi Direct configuration information of the new group to be created does not conflict with the Wi-Fi Direct configuration information of the existing group to which terminal A belongs.

Step 629: Terminal B sends terminal A an indication that terminal B requests to create a new group with terminal A.

Step 630: Terminal A prompts a user using terminal A whether to quit the existing group to which terminal A belongs. If the user using terminal A selects to quit the existing group to which terminal A belongs, step 631 is performed; if the user using terminal A selects not to quit the existing group to which terminal A belongs, step 632 is performed.

Step 631: Terminal A quits the existing group to which terminal A belongs, sets, according to the Wi-Fi Direct configuration information of terminal B and the Wi-Fi Direct configuration information of terminal A, the Wi-Fi Direct configuration information of the new group to be created, and establishes, according to the Wi-Fi Direct configuration information of the new group to be created, a Wi-Fi Direct connection with terminal B.

After terminal A quits the existing group to which terminal A belongs, because neither terminal A nor terminal B is a member of an existing group, terminal A and terminal B may establish a Wi-Fi Direct connection according to the method provided by the embodiment shown in FIG. 3 of the present invention. Details are not repeated herein.

Step 632: A Wi-Fi Direct connection fails to be established between terminal B and terminal A.

In this embodiment, only one of terminal A and terminal B is a member of an existing group. If the member of the existing group is a group owner of the existing group to which the member belongs, the member may be used as a group owner or a client in the new group to be created; if the member of the existing group is a client of the existing group to which the member belongs, the terminal can only be used as a group owner in the new group to be created.

Figure 7:
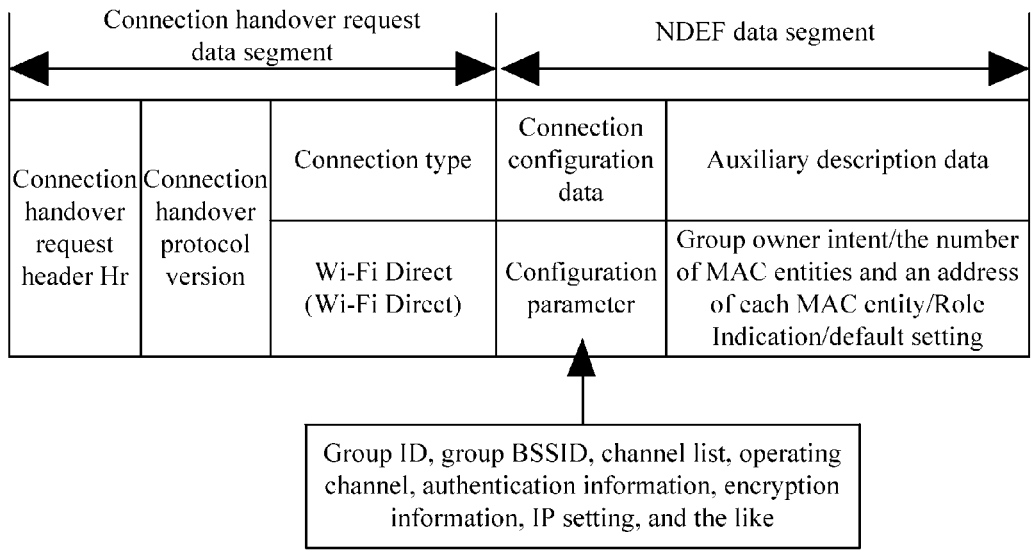
FIG. 7 is a schematic diagram of another embodiment of a format of a connection handover request according to the present invention.

In this embodiment, if terminal A is a member of the existing group and terminal A is a GO of the existing group to which terminal A belongs, and terminal B requests to join the existing group to which terminal A belongs, a format of an NFC connection handover request sent by terminal A to terminal B may be as shown in FIG. 7. FIG. 7 is a schematic diagram of another embodiment of a format of a connection handover request according to the present invention.

Figure 8:
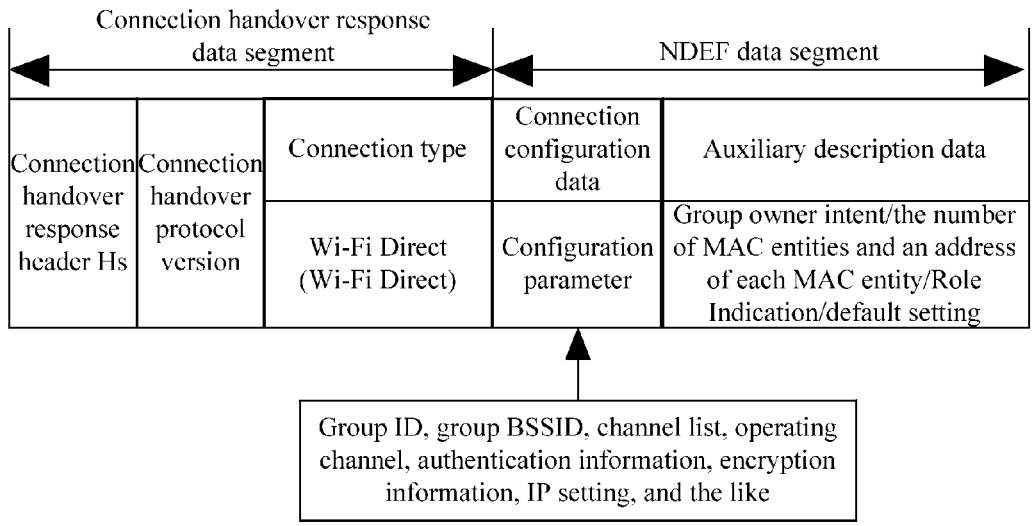
FIG. 8 is a schematic diagram of another embodiment of a format of a connection handover response according to the present invention.

If terminal B is a member of the existing group and terminal B is a GO of the existing group to which terminal B belongs, and terminal A requests to join the existing group to which terminal B belongs, a format of a connection handover response sent by terminal B to terminal A may be as shown in FIG. 8. FIG. 8 is a schematic diagram of another embodiment of a format of a connection handover response according to the present invention.

It should be noted that when the member of the existing group is a client of the existing group, the connection handover request shown in FIG. 7 or the connection handover response shown in FIG. 8 does not include authentication information or encryption information; when the member of the existing group quits the existing group, or when two terminals create a new group, reference may be made to FIG. 4 and FIG. 5 for the formats of the connection handover request and the connection handover response. Details are not repeated herein.

In the foregoing embodiment, terminal A and terminal B exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client cannot actively discover a GO or a client of another group. In this scenario, a Wi-Fi Direct connection cannot be established by using radio signaling, but this restriction does not exist when the technical solution provided by this embodiment is used. As long as terminal A and terminal B are within an NFC communication range, terminal A and terminal B can exchange configuration information, and both can establish a Wi-Fi Direct connection between terminal A and terminal B.

Figure 9A:
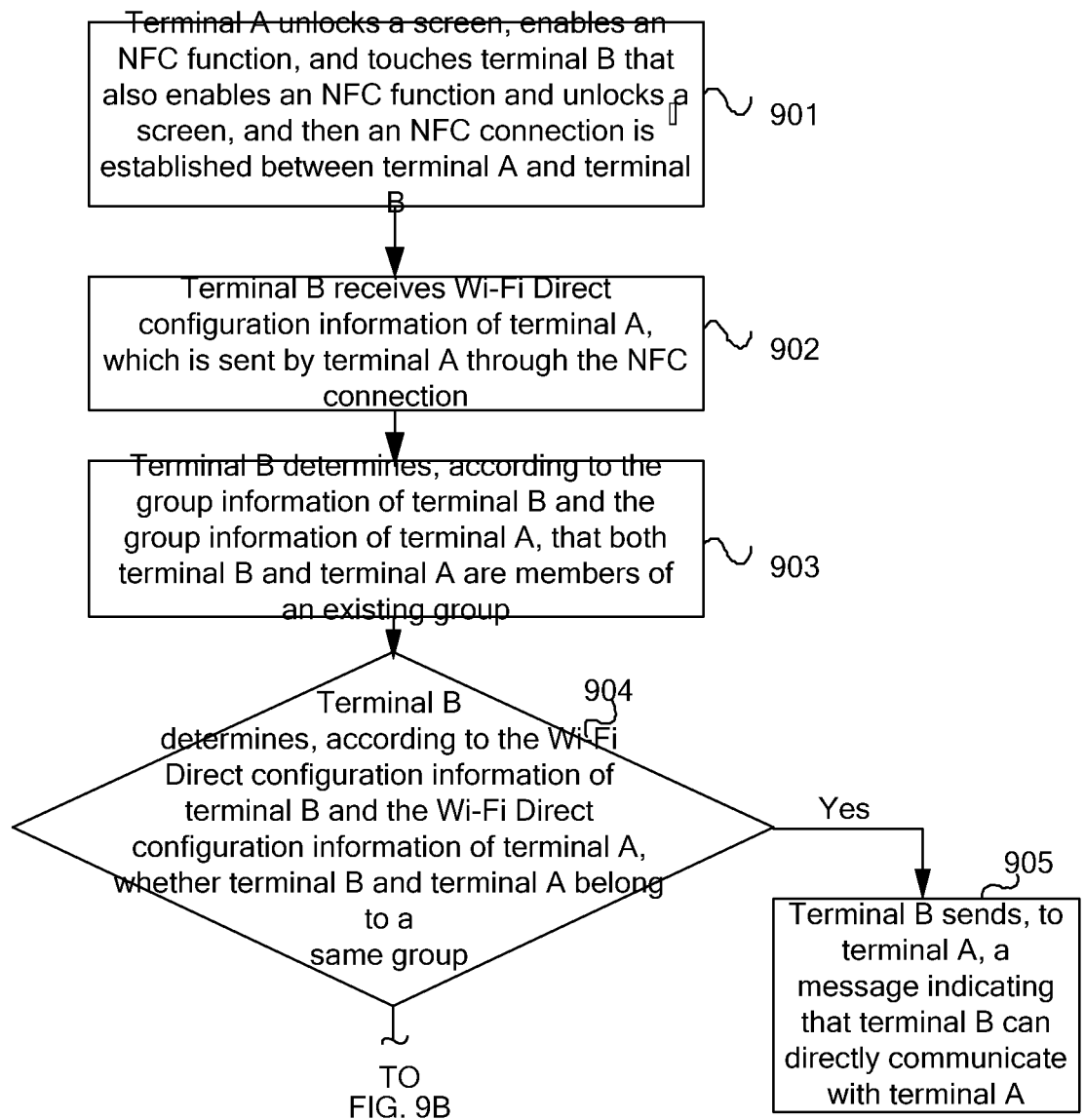
FIG. 9A and FIG. 9B are a flowchart of still another embodiment of a method for establishing a communication connection according to the present invention.
Figure 9B:
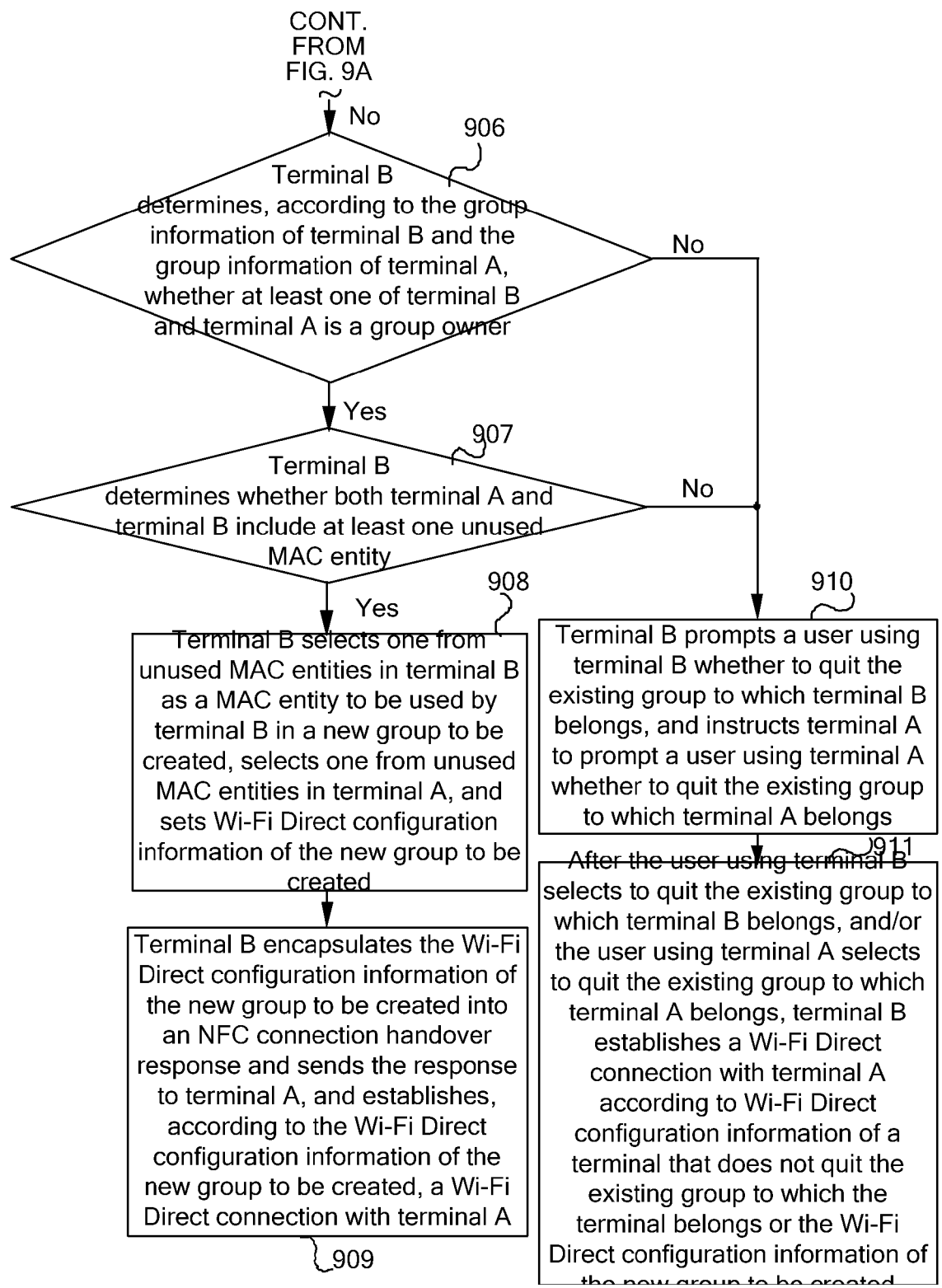

FIG. 9A and FIG. 9B are a flowchart of still another embodiment of a method for establishing a communication connection according to the present invention. As shown in FIG. 9A and FIG. 9B, the method for establishing a communication connection may include:

Step 901: Terminal A unlocks a screen, enables an NFC function, and touches terminal B that also enables an NFC function and unlocks a screen, and then an NFC connection is established between terminal A and terminal B.

Step 902: Terminal B receives Wi-Fi Direct configuration information of terminal A, which is sent by terminal A through the NFC connection.

During specific implementation, terminal A and terminal B may use a "handover request collision resolution mechanism" defined in the NFC connection handover protocol to decide Requester and Selector identities. However, this embodiment is described by using that terminal A is a Requester and terminal B is a Selector as an example.

In this embodiment, Wi-Fi Direct configuration information of terminal B includes group information of terminal B.

In this embodiment, the Wi-Fi Direct configuration information of terminal B may further include: a group owner intent of terminal B, the number of MAC entities in terminal B, and an address of each MAC entity; where a value of the group information of terminal B may be: terminal B being not a member of an existing group, or terminal B being a group owner of an existing group to which terminal B belongs, or terminal B being a client of an existing group to which terminal B belongs; and the Wi-Fi Direct configuration information of terminal A includes group information of terminal A, and the Wi-Fi Direct configuration information of terminal A may further include: a group owner intent of terminal A, the number of MAC entities in terminal A, and an address of each MAC entity; where a value of the group information of terminal A may be: terminal A being not a member of an existing group, or terminal A being a group owner of the existing group to which terminal A belongs, or terminal A being a client of the existing group to which terminal A belongs.

Step 903: Terminal B determines, according to the group information of terminal B and the group information of terminal A, that both terminal B and terminal A are members of an existing group.

Step 904: Terminal B determines, according to the Wi-Fi Direct configuration information of terminal B and the Wi-Fi Direct configuration information of terminal A, whether terminal B and terminal A belong to a same group. If terminal B and terminal A belong to a same group, step 905 is performed; if terminal B and terminal A do not belong to a same group, step 906 is performed.

Specifically, terminal B may check whether group IDs, group BSSIDs, MAC addresses of GOs, IP base addresses, and the like in the Wi-Fi Direct configuration information of terminal B and terminal A are the same, so as to determine whether terminal B and terminal A belong to a same group; if all the group IDs, group BSSIDs, MAC addresses of GOs, IP base addresses, and the like in the Wi-Fi Direct configuration information are the same, it can be determined that terminal B and terminal A belong to a same group; otherwise, it can be determined that terminal B and terminal A do not belong to a same group.

Step 905: Terminal B sends, to terminal A, a message indicating that terminal B can directly communicate with terminal A.

Specifically, if both terminal B and terminal A are clients, communication may be performed by using a GO, or a direct data connection is established with aid of a GO to perform communication; if one of terminal B and terminal A is a GO and the other is a client, communication may be directly performed.

Step 906: Terminal B determines, according to the group information of terminal B and the group information of terminal A, whether at least one of terminal B and terminal A is a group owner. If at least one of terminal B and terminal A is a group owner, step 907 is performed; if neither terminal B nor terminal A is a group owner, that is, both terminal B and terminal A are clients of the existing group, and step 910 is performed.

Step 907: Terminal B determines whether both terminal A and terminal B include at least one unused MAC entity; and if both terminal A and terminal B include at least one unused MAC entity, step 908 is performed; if all MAC entities in terminal A and/or terminal B are used, step 910 is performed.

Step 908: Terminal B selects one from unused MAC entities in terminal B as a MAC entity to be used by terminal B in a new group to be created, selects one from unused MAC entities in terminal A, and sets Wi-Fi Direct configuration information of the new group to be created.

The Wi-Fi Direct configuration information of the new group to be created may further include an address of the MAC entity selected by terminal B from terminal A.

In this embodiment, if only one of terminal B and terminal A is a group owner in the existing group, the terminal being a group owner in the existing group must be a client in the new group, and the group owner intent of the terminal must be set to be smaller than the group owner intent of the peer end in the Wi-Fi Direct configuration information of the new group; if both terminal B and terminal A are group owners in the existing group, group owner intents of the two terminals in the configuration information of the new group may be set at random, as long as values of the group owner intents of the two terminals are set to be different.

Step 909: Terminal B encapsulates the Wi-Fi Direct configuration information of the new group to be created into an NFC connection handover response and sends the response to terminal A, and establishes, according to the Wi-Fi Direct configuration information of the new group to be created, a Wi-Fi Direct connection with terminal A.

Step 910: Terminal B prompts a user using terminal B whether to quit the existing group to which terminal B belongs, and instructs terminal A to prompt a user using terminal A whether to quit the existing group to which terminal A belongs.

Step 911: After the user using terminal B selects to quit the existing group to which terminal B belongs, and/or the user using terminal A selects to quit the existing group to which terminal A belongs, terminal B establishes a Wi-Fi Direct connection with terminal A according to Wi-Fi Direct configuration information of a terminal that does not quit the existing group to which the terminal belongs or the Wi-Fi Direct configuration information of the new group to be created.

In this embodiment, if terminal B or terminal A not only reserves an original connection but also establishes a new connection, the terminal cannot be used as a client in both of the two groups. Specifically, if the terminal is used as a client in the original connection, the terminal must be used as a group owner in the new connection; if the terminal is used as a group owner in the original connection, the terminal can be used as a group owner or a client in the new group.

Specifically, if the user using terminal B selects to quit the existing group to which terminal B belongs, or the user using terminal A selects to quit the existing group to which terminal A belongs, terminal A and terminal B may establish a Wi-Fi Direct connection and communicate by using the method provided by the embodiment shown in FIG. 6A, FIG. 6B, FIG. 6C, and FIG. 6D of the present invention; if the user using terminal B selects to quit the existing group to which terminal B belongs, and the user using terminal A also selects to quit the existing group to which terminal A belongs, terminal A and terminal B may establish a Wi-Fi Direct connection and communicate by using the method provided by the embodiment shown in FIG. 3 of the present invention. Details are not repeated herein.

Figure 10:
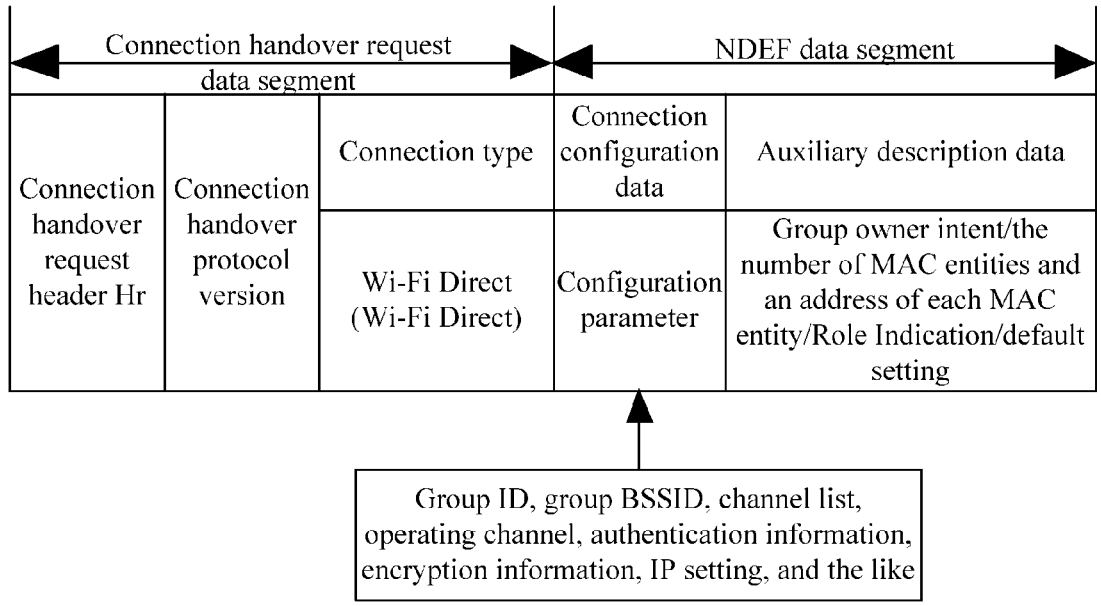
FIG. 10 is a schematic diagram of still another embodiment of a format of a connection handover request according to the present invention.
Figure 11:
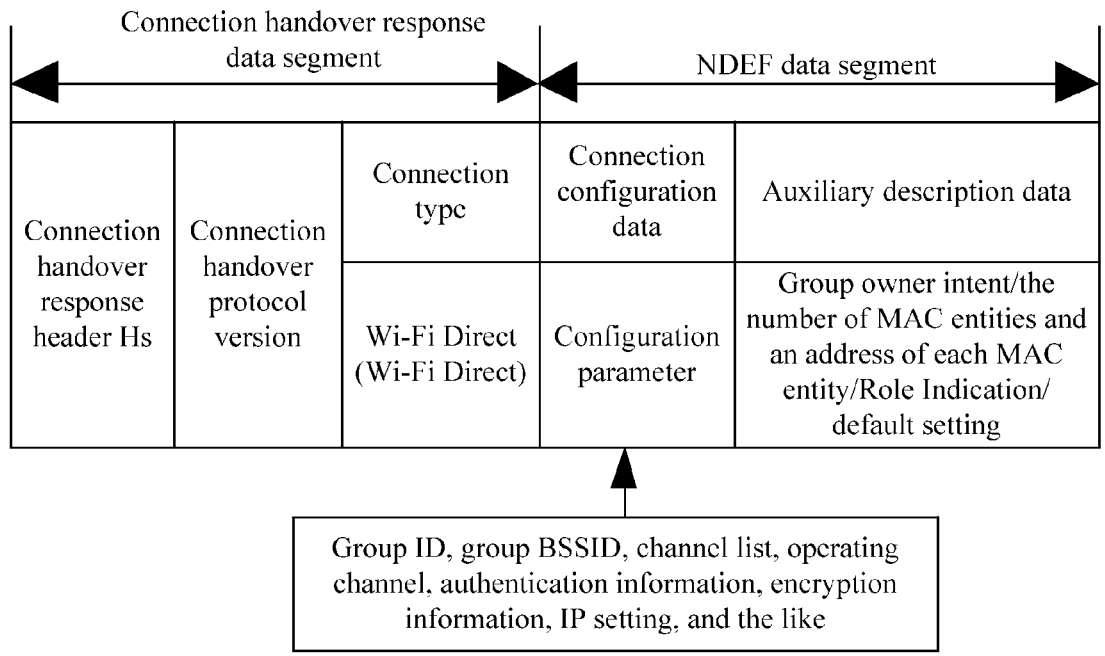
FIG. 11 is a schematic diagram of still another embodiment of a format of a connection handover response according to the present invention.

In this embodiment, when terminal A establishes an intergroup connection with terminal B to form a new group, formats of a used connection handover request and a used connection handover response may be as shown in FIG. 10 and FIG. 11 respectively. FIG. 10 is a schematic diagram of still another embodiment of a format of a connection handover request according to the present invention; and FIG. 11 is a schematic diagram of still another embodiment of a format of a connection handover response according to the present invention.

In the foregoing embodiment, terminal A and terminal B exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client cannot actively discover a GO or a client of another group. In this scenario, a Wi-Fi Direct connection cannot be established by using radio signaling, but this restriction does not exist when the technical solution provided by this embodiment is used. As long as terminal A and terminal B are within an NFC communication range, terminal A and terminal B can exchange configuration information, and both can establish a Wi-Fi Direct connection between terminal A and terminal B.

Persons of ordinary skill in the art may understand that all or a part of the steps in the method embodiments may be implemented by a program instructing relevant hardware. The program may be stored in a computer readable storage medium. When the program is run, the steps in the method embodiments are performed. The storage medium may be any medium that is capable of storing program code, such as a ROM, a RAM, a magnetic disk, or an optical disc.

Figure 12:
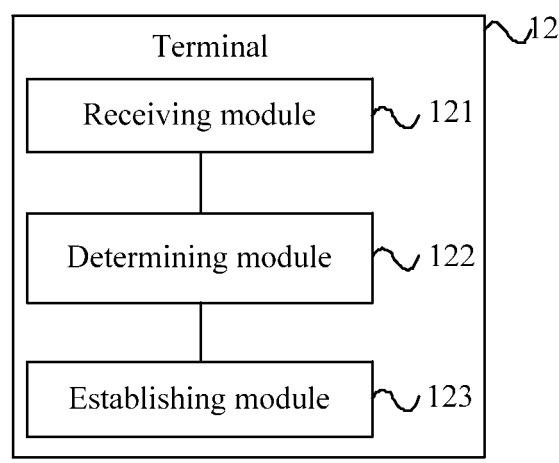
FIG. 12 is a schematic structural diagram of an embodiment of a terminal according to the present invention.

FIG. 12 is a schematic structural diagram of an embodiment of a terminal according to the present invention. A terminal 12 in this embodiment is a first terminal, and can implement the procedure of the embodiment shown in FIG. 1 of the present invention. As shown in FIG. 12, the terminal 12 may include: a receiving module 121, a determining module 122, and an establishing module 123;

the receiving module 121 is configured to receive Wi-Fi Direct configuration information of a second terminal, which is sent by the second terminal through an NFC connection between the first terminal and the second terminal, where the Wi-Fi Direct configuration information of the second terminal includes group information of the second terminal;

the determining module 122 is configured to determine, according to group information of the first terminal and the group information of the second terminal received by the receiving module 121, that neither the first terminal nor the second terminal is a member of an existing group; or determine, according to group information of the first terminal and the group information of the second terminal received by the receiving module 121, that at least one of the first terminal and the second terminal is a member of an existing group; and the establishing module 123 is configured to establish a Wi-Fi Direct connection with the second terminal according to Wi-Fi Direct configuration information of the first terminal and the Wi-Fi Direct configuration information of the second terminal when the determining module 122 determines that neither the first terminal nor the second terminal is a member of an existing group; or establish, when the determining module 122 determines that at least one of the first terminal and the second terminal is a member of an existing group, a Wi-Fi Direct connection with the second terminal according to Wi-Fi Direct configuration information of the existing group or a new group to be created.

In this embodiment, the Wi-Fi Direct configuration information of the second terminal received by the receiving module 121 may further include: a group owner intent of the second terminal, the number of MAC entities in the second terminal, and an address of each MAC entity;

the group information of the second terminal includes: the second terminal being not a member of an existing group, or the second terminal being a group owner of an existing group to which the second terminal belongs, or the second terminal being a client of an existing group to which the second terminal belongs;

the Wi-Fi Direct configuration information of the first terminal includes the group information of the first terminal; the group information of the first terminal includes: the first terminal being not a member of an existing group, or the first terminal being a group owner of an existing group to which the first terminal belongs, or the first terminal being a client of an existing group to which the first terminal belongs; and further, the Wi-Fi Direct configuration information of the first terminal may further include: a group owner intent of the first terminal, the number of MAC entities in the first terminal, and an address of each MAC entity; and the Wi-Fi Direct configuration information of the new group to be created includes an identifier of the new group to be created, a BSSID of the new group to be created, an operating channel of the new group to be created, the group owner intent of the first terminal, an IP base address of the new group to be created, and an address of a MAC entity used by the first terminal in the new group to be created.

In this embodiment, the first terminal and the second terminal exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client of a Wi-Fi Direct group cannot actively discover a GO or a client of another group. In this scenario, a Wi-Fi Direct connection cannot be established by using radio signaling, but this restriction does not exist in this embodiment. As long as the first terminal and the second terminal are within an NFC communication range, the first terminal and the second terminal can exchange configuration information, and both can establish a Wi-Fi Direct connection between the first terminal and the second terminal.

Figure 13:
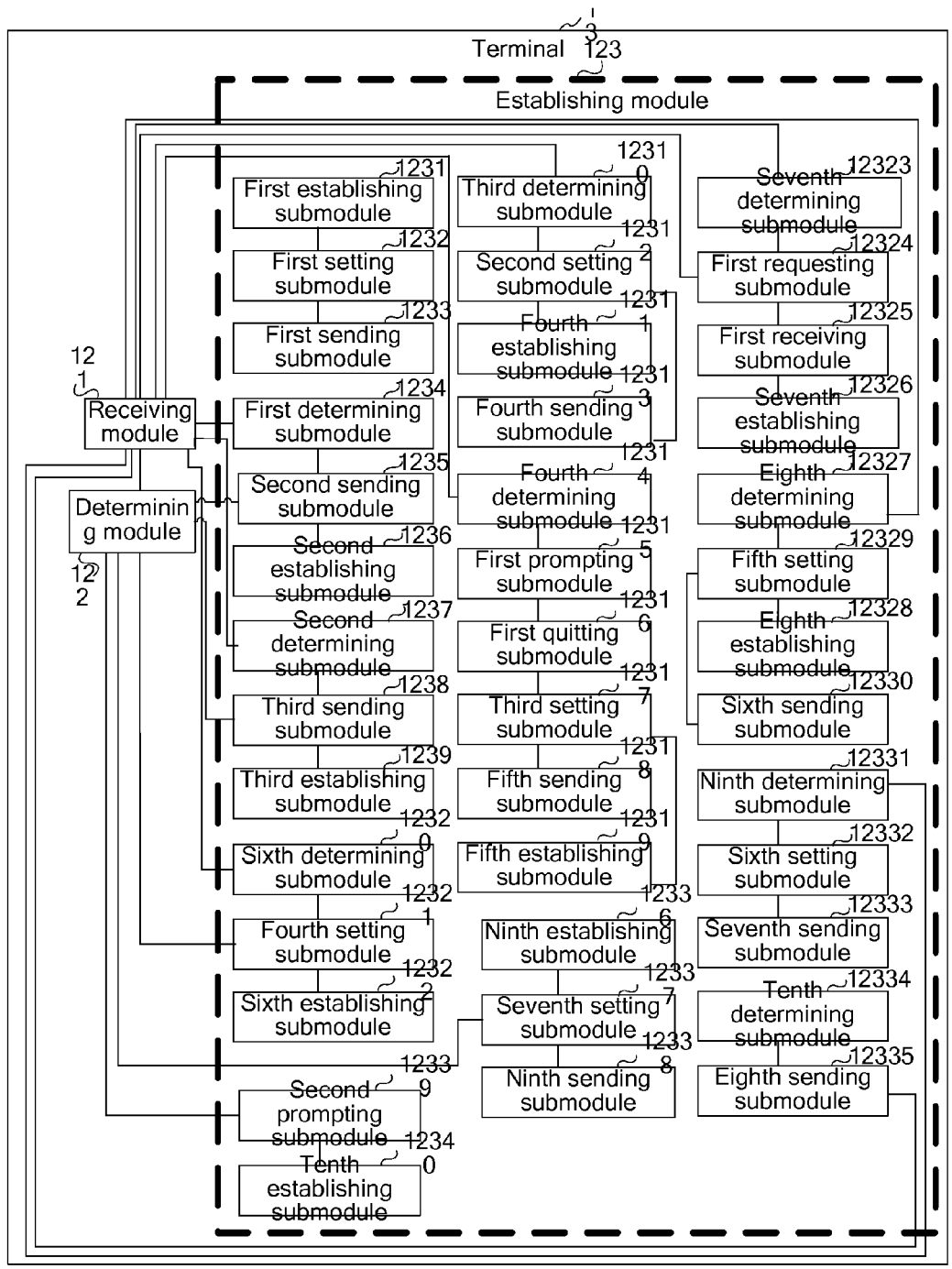
FIG. 13 is a schematic structural diagram of another embodiment of a terminal according to the present invention.

FIG. 13 is a schematic structural diagram of another embodiment of a terminal according to the present invention. Compared with the terminal 12 shown in FIG. 12, a difference of a terminal 13 shown in FIG. 13 lies in that, in an implementation manner of this embodiment, when the determining module 122 determines that neither the first terminal nor the second terminal is a member of an existing group, the establishing module 123 may include: a first establishing submodule 1231, a first setting submodule 1232, and a first sending submodule 1233;

the first setting submodule 1232 is configured to set, according to Wi-Fi Direct configuration information of the first terminal and Wi-Fi Direct configuration information of the second terminal, Wi-Fi Direct configuration information of a new group to be created; when the first setting submodule 1232 sets the Wi-Fi Direct configuration information of the new group to be created, for example, when the first setting submodule 1232 sets an identifier of the new group to be created, the first setting submodule 1232 may use a group identifier in the Wi-Fi Direct configuration information of the first terminal, or may also use a group identifier in the Wi-Fi Direct configuration information of the second terminal, or may neither use a group identifier in the Wi-Fi Direct configuration information of the first terminal nor use a group identifier in the Wi-Fi Direct configuration information of the second terminal but set a new identifier for the new group to be created. Likewise, a BSSID of the new group to be created, an operating channel of the new group to be created, an IP base address of the new group to be created, and an address of a MAC entity used in the new group to be created may also be set in the preceding manner, that is, corresponding information included in the Wi-Fi Direct configuration information of the first terminal or second terminal may be used, or a new value is set. Details are not repeated herein;

the first sending submodule 1233 is configured to send the Wi-Fi Direct configuration information of the new group to be created, which is set by the first setting submodule 1232, to the second terminal through an NFC connection; and the first establishing submodule 1231 is configured to establish a Wi-Fi Direct connection with the second terminal according to the Wi-Fi Direct configuration information of the new group to be created.

In another implementation manner of this embodiment, the determining module 122 being configured to determine, according to the group information of the first terminal and the group information of the second terminal, that at least one of the first terminal and the second terminal is a member of an existing group may be: the determining module 122 being specifically configured to determine, according to the group information of the first terminal and the group information of the second terminal, that the first terminal is a member of an existing group and the second terminal is not a member of an existing group.

Further, the receiving module 121 is further configured to receive a default setting of the second terminal, which is sent by the second terminal through the NFC connection. Specifically, the default setting of the second terminal may be included in the Wi-Fi Direct configuration information of the second terminal; or the default setting may also not be included in the Wi-Fi Direct configuration information of the second terminal but is sent to the first terminal along with the Wi-Fi Direct configuration information of the second terminal, where the default setting reflects that the second terminal requests to join the existing group to which the first terminal belongs or that the second terminal requests to create a new group with the first terminal.

In a specific implementation manner of this implementation manner, the establishing module 123 may include: a first determining submodule 1234, a second sending submodule 1235, and a second establishing submodule 1236;

the first determining submodule 1234 is configured to determine, according to the default setting of the second terminal received by the receiving module 121, that the second terminal requests to join the existing group to which the first terminal belongs;

the second sending submodule 1235 is configured to send Wi-Fi Direct configuration information of the existing group to which the first terminal belongs, to the second terminal through the NFC connection when the determining module 122 determines, according to the group information of the first terminal, that the first terminal is a group owner of the existing group to which the first terminal belongs, after the first determining submodule 1234 determines that the second terminal requests to join the existing group to which the first terminal belongs, so that the second terminal sets a value of the group owner intent in the Wi-Fi Direct configuration information of the second terminal to a value smaller than a value of the group owner intent in the Wi-Fi Direct configuration information of the first terminal according to the Wi-Fi Direct configuration information of the existing group, and in this way, the second terminal can be used as a client to join the existing group to which the first terminal belongs; and the second establishing submodule 1236 is configured to establish a Wi-Fi Direct connection with the second terminal according to the Wi-Fi Direct configuration information of the existing group.

In another specific implementation manner of this implementation manner, the establishing module 123 may include: a second determining submodule 1237, a third sending submodule 1238, and a third establishing submodule 1239;

the second determining submodule 1237 is configured to determine, according to the default setting of the second terminal received by the receiving module 121, that the second terminal requests to join the existing group to which the first terminal belongs;

the third sending submodule 1238 is configured to send configuration information except encryption information in the Wi-Fi Direct configuration information of the existing group and description information of a group owner of the existing group to the second terminal through the NFC connection when the determining module 122 determines, according to the group information of the first terminal, that the first terminal is a client of the existing group to which the first terminal belongs, after the second determining submodule 1237 determines that the second terminal requests to join the existing group to which the first terminal belongs, so that the second terminal requests the group owner for the encryption information in the Wi-Fi Direct configuration information of the existing group according to the description information of the group owner, and receives the encryption information in the Wi-Fi Direct configuration information of the existing group sent by the group owner; and the third establishing submodule 1239 is configured to establish a Wi-Fi Direct connection with the second terminal according to the Wi-Fi Direct configuration information of the existing group.

In still another specific implementation manner of this implementation manner, the establishing module 123 may include: a third determining submodule 12310, a fourth establishing submodule 12311, a second setting submodule 12312, and a fourth sending submodule 12313;

the third determining submodule 12310 is configured to determine, according to the default setting of the second terminal received by the receiving module 121, that the second terminal requests to create a new group with the first terminal;

the second setting submodule 12312 is configured to select one from unused MAC entities in the first terminal as a MAC entity to be used by the first terminal in the new group to be created, and set the Wi-Fi Direct configuration information of the new group to be created, when the third determining submodule 12310 determines that the first terminal includes at least one unused MAC entity, after the third determining submodule 12310 determines that the second terminal requests to create a new group with the first terminal, where the Wi-Fi Direct configuration information of the new group to be created does not conflict with Wi-Fi Direct configuration information of the existing group to which the first terminal belongs, and the Wi-Fi Direct configuration information of the new group to be created further includes the group information of the first terminal; specifically, when setting the Wi-Fi Direct configuration information of the new group to be created, the second setting submodule 12312 may use a part or all of the Wi-Fi Direct configuration information of the second terminal, or may also not use the Wi-Fi Direct configuration information of the second terminal but set new Wi-Fi Direct configuration information for the new group to be created; the present invention does not limit a manner of setting, by the second setting submodule 12312, the Wi-Fi Direct configuration information of the new group to be created, as long as the Wi-Fi Direct configuration information of the new group to be created does not conflict with the Wi-Fi Direct configuration information of the existing group to which the first terminal belongs;

the fourth sending submodule 12313 is configured to send the Wi-Fi Direct configuration information of the new group to be created, which is set by the second setting submodule 12312, to the second terminal through the NFC connection; and the fourth establishing submodule 12311 is configured to establish a Wi-Fi Direct connection with the second terminal according to the Wi-Fi Direct configuration information of the new group to be created, which is set by the second setting submodule 12312.

In still another specific implementation manner of this implementation manner, the establishing module 123 may include: a fourth determining submodule 12314, a first prompting submodule 12315, a first quitting submodule 12316, a third setting submodule 12317, a fifth sending submodule 12318, and a fifth establishing submodule 12319;

the fourth determining submodule 12314 is configured to determine, according to the default setting of the second terminal received by the receiving module 121, that the second terminal requests to create a new group with the first terminal;

the first prompting submodule 12315 is configured to prompt a user using the first terminal whether to quit the existing group to which the first terminal belongs, when the fourth determining submodule 12314 determines that all MAC entities in the first terminal are used, after the fourth determining submodule 12314 determines that the second terminal requests to create a new group with the first terminal;

the first quitting submodule 12316 is configured to make the first terminal quit the existing group to which the first terminal belongs, after the user using the first terminal selects to quit the existing group to which the first terminal belongs;

the third setting submodule 12317 is configured to set, according to the Wi-Fi Direct configuration information of the first terminal and the Wi-Fi Direct configuration information of the second terminal, the Wi-Fi Direct configuration information of the new group to be created, after the first quitting submodule 12316 makes the first terminal quit the existing group to which the first terminal belongs, where a value of the group owner intent of the first terminal is different from a value of the group owner intent of the second terminal in the Wi-Fi Direct configuration information of the new group to be created;

the fifth sending submodule 12318 is configured to send the Wi-Fi Direct configuration information of the new group to be created, which is set by the third setting submodule 12317, to the second terminal through the NFC connection; and the fifth establishing submodule 12319 is configured to establish a Wi-Fi Direct connection with the second terminal according to the Wi-Fi Direct configuration information of the new group to be created, which is set by the third setting submodule 12317.

In still another implementation manner of this embodiment, the determining module 122 being configured to determine, according to the group information of the first terminal and the group information of the second terminal, that at least one of the first terminal and the second terminal is a member of an existing group includes: the determining module 122 being specifically configured to determine, according to the group information of the first terminal and the group information of the second terminal, that the second terminal is a member of an existing group and the first terminal is not a member of an existing group.

In a specific implementation manner of this implementation manner, the establishing module 123 may include: a sixth determining submodule 12320, a fourth setting submodule 12321, and a sixth establishing submodule 12322;

the sixth determining submodule 12320 is configured to determine, according to a default setting of the first terminal received by the receiving module 121, that the first terminal requests to join the existing group to which the second terminal belongs;

the fourth setting submodule 12321 is configured to set a value of the group owner intent in the Wi-Fi Direct configuration information of the first terminal to a value smaller than a value of the group owner intent in the Wi-Fi Direct configuration information of the second terminal when the determining module 122 determines, according to the group information of the second terminal, that the second terminal is a group owner of the existing group to which the second terminal belongs, after the sixth determining submodule 12320 determines that the first terminal requests to join the existing group to which the second terminal belongs; and the sixth establishing submodule 12322 is configured to establish a Wi-Fi Direct connection with the second terminal according to the Wi-Fi Direct configuration information of the second terminal, where the Wi-Fi Direct configuration information of the second terminal is Wi-Fi Direct configuration information of the existing group to which the second terminal belongs.

In another specific implementation manner of this implementation manner, when the second terminal is a client of the existing group to which the second terminal belongs, the Wi-Fi Direct configuration information of the second terminal received by the receiving module 121 is configuration information except encryption information in Wi-Fi Direct configuration information of the existing group to which the second terminal belongs;

in this specific implementation manner, the receiving module 121 is further configured to receive description information of a group owner of the existing group to which the second terminal belongs, which is sent by the second terminal through the NFC connection; and specifically, the description information of the group owner of the existing group to which the second terminal belongs may be included in the Wi-Fi Direct configuration information of the second terminal; or the description information of the group owner of the existing group to which the second terminal belongs may also not be included in the Wi-Fi Direct configuration information of the second terminal but is sent to the first terminal along with the Wi-Fi Direct configuration information of the second terminal.

In this specific implementation manner, the establishing module 123 may include: a seventh determining submodule 12323, a first requesting submodule 12324, a first receiving submodule 12325, and a seventh establishing submodule 12326;

the seventh determining submodule 12323 is configured to determine, according to a default setting of the first terminal received by the receiving module 121, that the first terminal requests to join the existing group to which the second terminal belongs;

the first requesting submodule 12324 is configured to request, according to the description information of the group owner of the existing group to which the second terminal belongs, which is received by the receiving module 121, the group owner for the encryption information in the Wi-Fi Direct configuration information of the existing group to which the second terminal belongs;

the first receiving submodule 12325 is configured to receive the encryption information in the Wi-Fi Direct configuration information of the existing group sent by the group owner, and in this way, the first terminal obtains all Wi-Fi Direct configuration information of the existing group; and the seventh establishing submodule 12326 is configured to establish a Wi-Fi Direct connection with the second terminal according to the Wi-Fi Direct configuration information of the existing group.

In still another specific implementation manner of this implementation manner, the establishing module 123 may include: an eighth determining submodule 12327, an eighth establishing submodule 12328, a fifth setting submodule 12329, and a sixth sending submodule 12330;

the eighth determining submodule 12327 is configured to determine, according to a default setting of the first terminal received by the receiving module 121, that the first terminal requests to create a new group with the second terminal;

the fifth setting submodule 12329 is configured to select one from unused MAC entities in the second terminal and set the Wi-Fi Direct configuration information of the new group to be created, when the eighth determining submodule 12327 determines that the second terminal includes at least one unused MAC entity, after the eighth determining submodule 12327 determines that the first terminal requests to create a new group with the second terminal, where the Wi-Fi Direct configuration information of the new group to be created further includes an address of the MAC entity selected by the first terminal from the second terminal, and the Wi-Fi Direct configuration information of the new group to be created does not conflict with Wi-Fi Direct configuration information of the existing group to which the second terminal belongs; specifically, when setting the Wi-Fi Direct configuration information of the new group to be created, the fifth setting submodule 12329 may use a part or all of the Wi-Fi Direct configuration information of the first terminal, or may also not use the Wi-Fi Direct configuration information of the first terminal but set new Wi-Fi Direct configuration information for the new group to be created; the present invention does not limit a manner of setting, by the fifth setting submodule 12329, the Wi-Fi Direct configuration information of the new group to be created, as long as the Wi-Fi Direct configuration information of the new group to be created does not conflict with the Wi-Fi Direct configuration information of the existing group to which the second terminal belongs;

the sixth sending submodule 12330 is configured to send the Wi-Fi Direct configuration information of the new group to be created, which is set by the fifth setting submodule 12329, to the second terminal through the NFC connection; and the eighth establishing submodule 12328 is further configured to establish a Wi-Fi Direct connection with the second terminal according to the Wi-Fi Direct configuration information of the new group to be created, which is set by the fifth setting submodule 12329.

In still another specific implementation manner of this implementation manner, the establishing module 123 may include: a ninth determining submodule 12331, a sixth setting submodule 12332, and a seventh sending submodule 12333;

the ninth determining submodule 12331 is configured to determine, according to a default setting of the first terminal received by the receiving module 121, that the first terminal requests to create a new group with the second terminal;

the sixth setting submodule 12332 is configured to set the Wi-Fi Direct configuration information of the new group to be created, when the ninth determining submodule 12331 determines that the second terminal includes at least one unused MAC entity, after the ninth determining submodule 12331 determines that the first terminal requests to create a new group with the second terminal, where the Wi-Fi Direct configuration information of the new group to be created does not conflict with Wi-Fi Direct configuration information of the existing group to which the second terminal belongs; specifically, when setting the Wi-Fi Direct configuration information of the new group to be created, the sixth setting submodule 12332 may use a part or all of the Wi-Fi Direct configuration information of the first terminal, or may also not use the Wi-Fi Direct configuration information of the first terminal but set new Wi-Fi Direct configuration information for the new group to be created; the present invention does not limit a manner of setting, by the sixth setting submodule 12332, the Wi-Fi Direct configuration information of the new group to be created, as long as the Wi-Fi Direct configuration information of the new group to be created does not conflict with the Wi-Fi Direct configuration information of the existing group to which the second terminal belongs; and the seventh sending submodule 12333 is configured to send the Wi-Fi Direct configuration information of the new group to be created, which is set by the sixth setting submodule 12332, to the second terminal through the NFC connection, so that the second terminal selects one from unused MAC entities in the second terminal and establishes, according to the Wi-Fi Direct configuration information of the new group to be created, a Wi-Fi Direct connection with the first terminal.

In still another specific implementation manner of this implementation manner, the establishing module 123 may include: a tenth determining submodule 12334 and an eighth sending submodule 12335;

the tenth determining submodule 12334 is configured to determine, according to a default setting of the first terminal received by the receiving module 121, that the first terminal requests to create a new group with the second terminal; and the eighth sending submodule 12335 is configured to send the second terminal an indication that the first terminal requests to create a new group with the second terminal, when the tenth determining submodule 12334 determines that all MAC entities in the second terminal are used, after the tenth determining submodule 12334 determines that the first terminal requests to create a new group with the second terminal, so that the second terminal prompts a user using the second terminal whether to quit the existing group to which the second terminal belongs, and quits, after the user using the second terminal selects to quit the existing group to which the second terminal belongs, the existing group to which the second terminal belongs, sets, according to the Wi-Fi Direct configuration information of the first terminal and the Wi-Fi Direct configuration information of the second terminal, the Wi-Fi Direct configuration information of the new group to be created, and establishes, according to the Wi-Fi Direct configuration information of the new group to be created, a Wi-Fi Direct connection with the first terminal.

In still another implementation manner of this embodiment, the determining module 122 being configured to determine, according to the group information of the first terminal and the group information of the second terminal, that at least one of the first terminal and the second terminal is a member of an existing group includes: the determining module 122 being specifically configured to determine, according to the group information of the first terminal and the group information of the second terminal, that both the first terminal and the second terminal are members of an existing group.

In a specific implementation manner of this implementation manner, the establishing module 123 may include: a ninth establishing submodule 12336, a seventh setting submodule 12337, and a ninth sending submodule 12338;

the seventh setting submodule 12337 is configured to select one from unused MAC entities in the first terminal as a MAC entity to be used by the first terminal in the new group to be created, select one from unused MAC entities in the second terminal, and set the Wi-Fi Direct configuration information of the new group to be created, when it is determined, according to the Wi-Fi Direct configuration information of the first terminal and the Wi-Fi Direct configuration information of the second terminal, that the first terminal and the second terminal do not belong to a same group and that both the first terminal and the second terminal include at least one unused MAC entity, and the determining module 122 determines, according to the group information of the first terminal and the group information of the second terminal, that at least one of the first terminal and the second terminal is a group owner, where the Wi-Fi Direct configuration information of the new group to be created further includes an address of the MAC entity selected by the first terminal from the second terminal;

the ninth sending submodule 12338 is configured to send the Wi-Fi Direct configuration information of the new group to be created, which is set by the seventh setting submodule 12337, to the second terminal through the NFC connection; and the ninth establishing submodule 12336 is configured to establish a Wi-Fi Direct connection with the second terminal according to the Wi-Fi Direct configuration information of the new group to be created, which is set by the seventh setting submodule 12337.

It should be noted that in this embodiment, if only one of the first terminal and the second terminal is a group owner in the existing group, the terminal being a group owner in the existing group must be a client in the new group, and the group owner intent of the terminal must be set to be smaller than the group owner intent of the peer end in the Wi-Fi Direct configuration information of the new group; if both the first terminal and the second terminal are group owners in the existing group, group owner intents of the two terminals in the configuration information of the new group may be set at random, as long as values of the group owner intents of the two terminals are set to be different.

In another specific implementation manner of this implementation manner, the establishing module 123 may include: a second prompting submodule 12339 and a tenth establishing submodule 12340;

the second prompting submodule 12339 is configured to prompt a user using the first terminal whether to quit the existing group to which the first terminal belongs, and instruct the second terminal to prompt a user using the second terminal whether to quit the existing group to which the second terminal belongs, when it is determined, according to the Wi-Fi Direct configuration information of the first terminal and the Wi-Fi Direct configuration information of the second terminal, that the first terminal and the second terminal do not belong to a same group, and the determining module 122 determines, according to the group information of the first terminal and the group information of the second terminal, that neither the first terminal nor the second terminal is a group owner, or when it is determined, according to the Wi-Fi Direct configuration information of the first terminal and the Wi-Fi Direct configuration information of the second terminal, that the first terminal and the second terminal do not belong to a same group and that all MAC entities in the first terminal and/or the second terminal are used; and the tenth establishing submodule 12340 is configured to establish a Wi-Fi Direct connection with the second terminal according to Wi-Fi Direct configuration information of a terminal that does not quit the existing group to which the terminal belongs or the Wi-Fi Direct configuration information of the new group to be created, after the user using the first terminal selects to quit the existing group to which the first terminal belongs, and/or the user using the second terminal selects to quit the existing group to which the second terminal belongs.

If the first terminal or the second terminal not only reserves an original connection but also establishes a new connection, the terminal cannot be used as a client in both of the two groups. Specifically, if the terminal is used as a client in the original connection, the terminal must be used as a group owner in the new connection; if the terminal is used as a group owner in the original connection, the terminal can be used as a group owner or a client in the new group.

In the foregoing embodiment, the first terminal and the second terminal exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client cannot actively discover a GO or a client of another group. In this scenario, a Wi-Fi Direct connection cannot be established by using radio signaling, but this restriction does not exist when the technical solution provided by this embodiment is used. As long as the first terminal and the second terminal are within an NFC communication range, the first terminal and the second terminal can exchange configuration information, and both can establish a Wi-Fi Direct connection between the first terminal and the second terminal.

Figure 14:
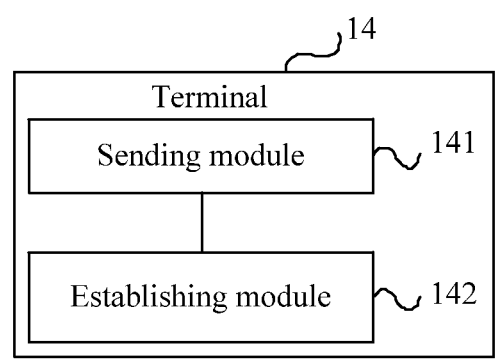
FIG. 14 is a schematic structural diagram of still another embodiment of a terminal according to the present invention.

FIG. 14 is a schematic structural diagram of still another embodiment of a terminal according to the present invention. A terminal 14 in this embodiment can be used as a first terminal to implement the procedure of the embodiment shown in FIG. 1 of the present invention. As shown in FIG. 14, the terminal 14 may include: a sending module 141 and an establishing module 142;

the sending module 141 is configured to send Wi-Fi Direct configuration information of the first terminal to a second terminal through an NFC connection between the first terminal and the second terminal, where the Wi-Fi Direct configuration information of the first terminal includes group information of the first terminal; and the establishing module 142 is configured to establish a Wi-Fi Direct connection with the second terminal according to the Wi-Fi Direct configuration information of the first terminal and Wi-Fi Direct configuration information of the second terminal when neither the first terminal nor the second terminal is a member of an existing group; or establish, when at least one of the first terminal and the second terminal is a member of an existing group, a Wi-Fi Direct connection with the second terminal according to Wi-Fi Direct configuration information of the existing group or a new group to be created.

In this embodiment, the Wi-Fi Direct configuration information of the first terminal sent by the sending module 141 may further include: a group owner intent of the first terminal, the number of MAC entities in the first terminal, and an address of each MAC entity;

a value of the group information of the first terminal may be: the first terminal being not a member of an existing group, or the first terminal being a group owner of an existing group to which the first terminal belongs, or the first terminal being a client of an existing group to which the first terminal belongs;

the Wi-Fi Direct configuration information of the second terminal may include: group information of the second terminal, a group owner intent of the second terminal, the number of MAC entities in the second terminal, and an address of each MAC entity;

a value of the group information of the second terminal may be: the second terminal being not a member of an existing group, or the second terminal being a group owner of an existing group to which the second terminal belongs, or the second terminal being a client of an existing group to which the second terminal belongs; and the Wi-Fi Direct configuration information of the new group to be created includes an identifier of the new group to be created, a BSSID of the new group to be created, an operating channel of the new group to be created, the group owner intent of the second terminal, an IP base address of the new group to be created, and an address of a MAC entity used by the second terminal in the new group to be created.

In the foregoing embodiment, the first terminal and the second terminal exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client cannot actively discover a GO or a client of another group. In this scenario, a Wi-Fi Direct connection cannot be established by using radio signaling, but this restriction does not exist when the technical solution provided by this embodiment is used. As long as the first terminal and the second terminal are within an NFC communication range, the first terminal and the second terminal can exchange configuration information, and both can establish a Wi-Fi Direct connection between the first terminal and the second terminal.

Figure 15:
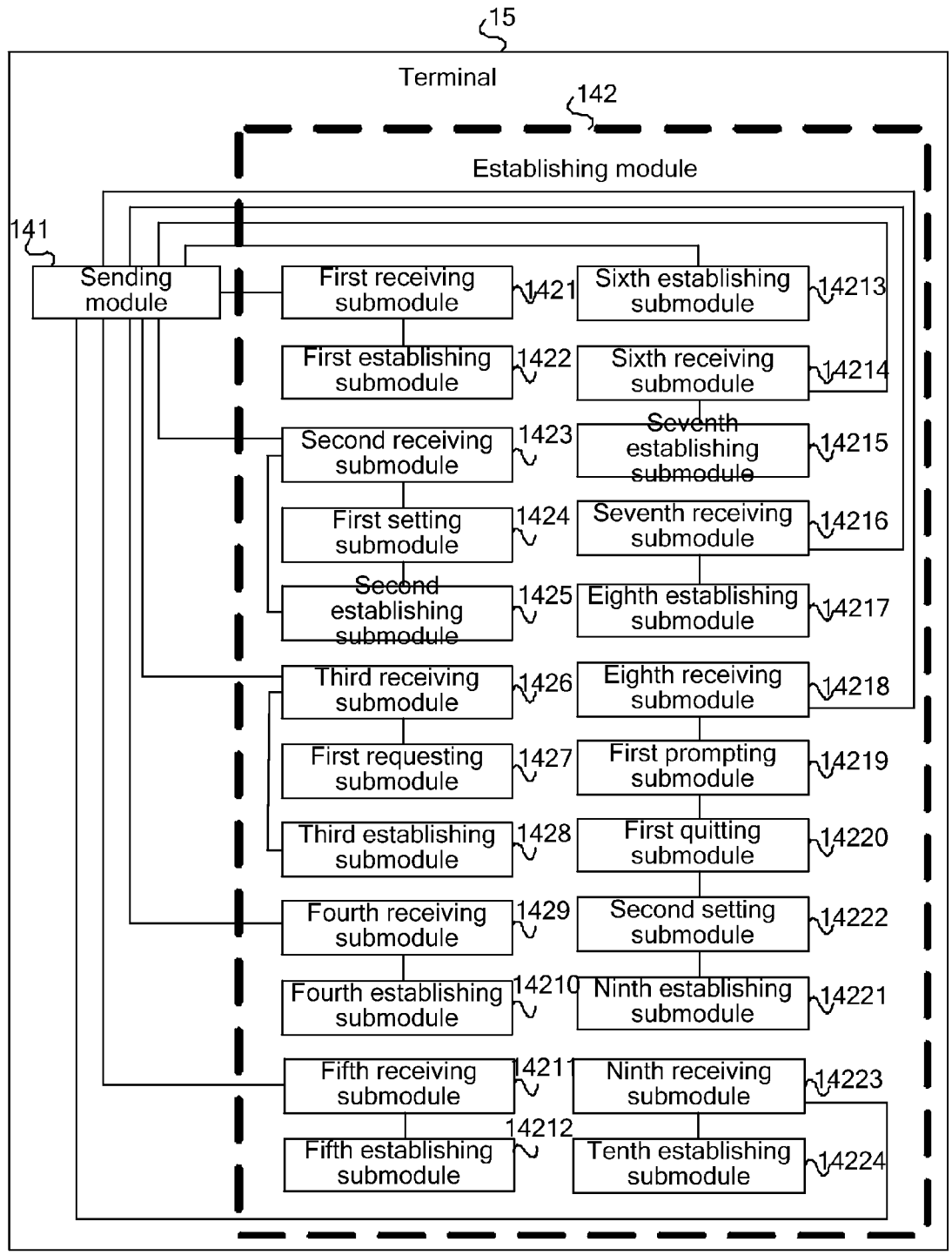
FIG. 15 is a schematic structural diagram of still another embodiment of a terminal according to the present invention.

FIG. 15 is a schematic structural diagram of still another embodiment of a terminal according to the present invention. Compared with the terminal 14 shown in FIG. 14, a difference of a terminal 15 shown in FIG. 15 lies in that, in an implementation manner of this embodiment, when neither the first terminal nor the second terminal is a member of an existing group, the establishing module 142 may include: a first receiving submodule 1421 and a first establishing submodule 1422;

the first receiving submodule 1421 is configured to receive Wi-Fi Direct configuration information of a new group to be created, which is sent by the second terminal through the NFC connection, where the Wi-Fi Direct configuration information of the new group to be created is set, according to Wi-Fi Direct configuration information of the first terminal and Wi-Fi Direct configuration information of the second terminal, and sent by the second terminal to the first terminal; and the first establishing submodule 1422 is configured to establish a Wi-Fi Direct connection with the second terminal according to the Wi-Fi Direct configuration information of the new group to be created, which is received by the first receiving submodule 1421.

In another implementation manner of this embodiment, when at least one of the first terminal and the second terminal is a member of an existing group, the sending module 141 is further configured to send a default setting of the first terminal to the second terminal through the NFC connection. Specifically, the default setting of the first terminal may be included in the Wi-Fi Direct configuration information of the first terminal and sent to the second terminal; or the default setting may also not be included in the Wi-Fi Direct configuration information of the first terminal but is sent to the second terminal along with the Wi-Fi Direct configuration information of the first terminal. The default setting of the first terminal may be that the first terminal requests to join an existing group to which the second terminal belongs or that the first terminal requests to create a new group with the second terminal.

In a specific implementation manner of this implementation manner, the establishing module 142 may include: a second receiving submodule 1423, a first setting submodule 1424, and a second establishing submodule 1425;

the second receiving submodule 1423 is configured to receive, when the first terminal is not a member of an existing group and the second terminal is a member of an existing group, Wi-Fi Direct configuration information of the existing group to which the second terminal belongs, which is sent by the second terminal through the NFC connection, where the Wi-Fi Direct configuration information of the existing group is sent by the second terminal to the first terminal after the second terminal determines, according to the default setting of the first terminal, that the first terminal requests to join the existing group to which the second terminal belongs, and the second terminal determines, according to the group information of the second terminal, that the second terminal is a group owner of the existing group to which the second terminal belongs;

the first setting submodule 1424 is configured to set a value of the group owner intent in the Wi-Fi Direct configuration information of the first terminal to a value smaller than a value of the group owner intent in the Wi-Fi Direct configuration information of the second terminal according to the Wi-Fi Direct configuration information of the existing group received by the second receiving submodule 1423; and the second establishing submodule 1425 is configured to establish, after the first setting submodule 1424 sets the value of the group owner intent in the Wi-Fi Direct configuration information of the first terminal, a Wi-Fi Direct connection with the second terminal according to the Wi-Fi Direct configuration information of the existing group received by the second receiving submodule 1423.

In another specific implementation manner of this implementation manner, the establishing module 142 may include: a third receiving submodule 1426, a first requesting submodule 1427, and a third establishing submodule 1428;

the third receiving submodule 1426 is configured to receive, when the first terminal is not a member of an existing group and the second terminal is a member of an existing group, configuration information except encryption information in Wi-Fi Direct configuration information of the existing group to which the second terminal belongs and description information of a group owner of the existing group, which are sent by the second terminal through the NFC connection, where the configuration information except the encryption information in the Wi-Fi Direct configuration information of the existing group to which the second terminal belongs and the description information of the group owner of the existing group are sent by the second terminal to the first terminal after the second terminal determines, according to the default setting of the first terminal, that the first terminal requests to join the existing group to which the second terminal belongs, and the second terminal determines, according to the group information of the second terminal, that the second terminal is a client of the existing group to which the second terminal belongs;

the first requesting submodule 1427 is configured to request the group owner for the encryption information in the Wi-Fi Direct configuration information of the existing group according to the description information of the group owner received by the third receiving submodule 1426, and in this way, the first terminal obtains all Wi-Fi Direct configuration information of the existing group;

the third receiving submodule 1426 is further configured to receive, after the first requesting submodule 1427 requests the group owner for the encryption information in the Wi-Fi Direct configuration information of the existing group, the encryption information in the Wi-Fi Direct configuration information of the existing group sent by the group owner; and the third establishing submodule 1428 is configured to establish a Wi-Fi Direct connection with the second terminal according to the Wi-Fi Direct configuration information of the existing group.

In still another specific implementation manner of this implementation manner, the establishing module 142 may include: a fourth receiving submodule 1429 and a fourth establishing submodule 14210;

the fourth receiving submodule 1429 is configured to receive, when the first terminal is not a member of an existing group and the second terminal is a member of an existing group, the Wi-Fi Direct configuration information of the new group to be created, which is sent by the second terminal through the NFC connection; and the fourth establishing submodule 14210 is configured to establish a Wi-Fi Direct connection with the second terminal according to the Wi-Fi Direct configuration information of the new group to be created, which is received by the fourth receiving submodule 1429; where the Wi-Fi Direct configuration information of the new group to be created is sent by the second terminal to the first terminal after the second terminal selects one from unused MAC entities in the second terminal as a MAC entity to be used by the second terminal in the new group to be created and sets the Wi-Fi Direct configuration information of the new group to be created, when the second terminal determines, according to the default setting of the first terminal, that the first terminal requests to create a new group with the second terminal, and the second terminal determines that the second terminal includes at least one unused MAC entity, where the Wi-Fi Direct configuration information of the new group to be created does not conflict with Wi-Fi Direct configuration information of the existing group to which the second terminal belongs, and the Wi-Fi Direct configuration information of the new group to be created further includes the group information of the second terminal.

In still another specific implementation manner of this implementation manner, the establishing module 142 may include: a fifth receiving submodule 14211 and a fifth establishing submodule 14212;

the fifth receiving submodule 14211 is configured to receive, when the first terminal is not a member of an existing group and the second terminal is a member of an existing group, the Wi-Fi Direct configuration information of the new group to be created, which is sent by the second terminal through the NFC connection; and the fifth establishing submodule 14212 is configured to establish a Wi-Fi Direct connection with the second terminal according to the Wi-Fi Direct configuration information of the new group to be created; where the Wi-Fi Direct configuration information of the new group to be created is sent by the second terminal to the first terminal after the second terminal quits the existing group to which the second terminal belongs and sets, according to the Wi-Fi Direct configuration information of the first terminal and the Wi-Fi Direct configuration information of the second terminal, the Wi-Fi Direct configuration information of the new group to be created, if a user using the second terminal selects to quit the existing group to which the second terminal belongs when the second terminal prompts the user using the second terminal whether to quit the existing group to which the second terminal belongs, when the second terminal determines, according to the default setting of the first terminal, that the first terminal requests to create a new group with the second terminal, and the second terminal determines that all MAC entities in the second terminal are used; and a value of the group owner intent of the second terminal is different from a value of the group owner intent of the first terminal in the Wi-Fi Direct configuration information of the new group to be created.

In still another implementation manner of this embodiment, the establishing module 142 may include: a sixth establishing submodule 14213;

the sixth establishing submodule 14213 is configured to establish, when the first terminal is a member of an existing group and the second terminal is not a member of an existing group, a Wi-Fi Direct connection with the second terminal according to the Wi-Fi Direct configuration information of the first terminal after the second terminal sets a value of the group owner intent in the Wi-Fi Direct configuration information of the second terminal to a value smaller than a value of the group owner intent in the Wi-Fi Direct configuration information of the first terminal, if the second terminal determines, according to a default setting of the second terminal, that the second terminal requests to join the existing group to which the first terminal belongs, and the second terminal determines, according to the group information of the first terminal, that the first terminal is a group owner of the existing group to which the first terminal belongs, and in this case, the Wi-Fi Direct configuration information of the first terminal is Wi-Fi Direct configuration information of the existing group to which the first terminal belongs.

In still another implementation manner of this embodiment, when the first terminal is a member of an existing group and the second terminal is not a member of an existing group, and the first terminal is a client of the existing group to which the first terminal belongs, the Wi-Fi Direct configuration information of the first terminal sent by the sending module 141 is configuration information except encryption information in the Wi-Fi Direct configuration information of the existing group to which the first terminal belongs; and the sending module 141 is further configured to send description information of a group owner of the existing group to which the first terminal belongs, to the second terminal through the NFC connection; and specifically, the description information of the group owner of the existing group to which the first terminal belongs may be included in the Wi-Fi Direct configuration information of the first terminal; or the description information of the group owner of the existing group to which the first terminal belongs may also not be included in the Wi-Fi Direct configuration information of the first terminal but is sent to the second terminal along with the Wi-Fi Direct configuration information of the first terminal.

In still another implementation manner of this embodiment, the establishing module 142 may include: a sixth receiving submodule 14214 and a seventh establishing submodule 14215;

the sixth receiving submodule 14214 is configured to receive, when the first terminal is a member of an existing group and the second terminal is not a member of an existing group, the Wi-Fi Direct configuration information of the new group to be created, which is sent by the second terminal through the NFC connection; and the seventh establishing submodule 14215 is configured to establish a Wi-Fi Direct connection with the second terminal according to the Wi-Fi Direct configuration information of the new group to be created, which is received by the sixth receiving submodule 14214;

specifically, the Wi-Fi Direct configuration information of the new group to be created that is received by the sixth receiving submodule 14214 is sent by the second terminal to the first terminal after the second terminal selects one from unused MAC entities in the first terminal and sets the Wi-Fi Direct configuration information of the new group to be created, after the second terminal determines, according to a default setting of the second terminal, that the second terminal requests to create a new group with the first terminal, and the second terminal determines that the first terminal includes at least one unused MAC entity, where the Wi-Fi Direct configuration information of the new group to be created further includes an address of the MAC entity selected by the second terminal from the first terminal, and the Wi-Fi Direct configuration information of the new group to be created does not conflict with Wi-Fi Direct configuration information of the existing group to which the second terminal belongs.

In still another implementation manner of this embodiment, the establishing module 142 may include: a seventh receiving submodule 14216 and an eighth establishing submodule 14217;

the seventh receiving submodule 14216 is configured to receive, when the first terminal is a member of an existing group and the second terminal is not a member of an existing group, Wi-Fi Direct configuration information sent by the second terminal through the NFC connection, where the Wi-Fi Direct configuration information sent by the second terminal is set and sent by the second terminal to the first terminal after the second terminal determines, according to a default setting of the second terminal, that the second terminal requests to create a new group with the first terminal and determines that the first terminal includes at least one unused MAC entity, and the Wi-Fi Direct configuration information of the new group to be created does not conflict with Wi-Fi Direct configuration information of the existing group to which the first terminal belongs; and the eighth establishing submodule 14217 is configured to select one from unused MAC entities in the first terminal, and establish, according to the Wi-Fi Direct configuration information of the new group to be created that is received by the seventh receiving submodule 14216, a Wi-Fi Direct connection with the second terminal.

In still another implementation manner of this embodiment, the establishing module 142 may include: an eighth receiving submodule 14218, a first prompting submodule 14219, a first quitting submodule 14220, a ninth establishing submodule 14221, and a second setting submodule 14222;

the eighth receiving submodule 14218 is configured to receive, when the first terminal is a member of an existing group and the second terminal is not a member of an existing group, an indication sent by the second terminal that the second terminal requests to create a new group with the first terminal, where the indication is sent by the second terminal to the first terminal after the second terminal determines, according to a default setting of the second terminal, that the second terminal requests to create a new group with the first terminal, and determines that all MAC entities in the first terminal are used;

the first prompting submodule 14219 is configured to prompt a user using the first terminal whether to quit the existing group to which the first terminal belongs;

the first quitting submodule 14220 is configured to quit the existing group to which the first terminal belongs, after the user using the first terminal selects to quit the existing group to which the first terminal belongs;

the second setting submodule 14222 is configured to set, according to the Wi-Fi Direct configuration information of the first terminal and the Wi-Fi Direct configuration information of the second terminal, the Wi-Fi Direct configuration information of the new group to be created; and the ninth establishing submodule 14221 is configured to establish a Wi-Fi Direct connection with the second terminal according to the Wi-Fi Direct configuration information of the new group to be created, which is set by the second setting submodule 14222.

In still another implementation manner of this embodiment, the establishing module 142 may include: a ninth receiving submodule 14223 and a tenth establishing submodule 14224;

the ninth receiving submodule 14223 is configured to receive, when both the first terminal and the second terminal are members of an existing group, the Wi-Fi Direct configuration information of the new group to be created, which is sent by the second terminal through the NFC connection; and the tenth establishing submodule 14224 is configured to establish a Wi-Fi Direct connection with the second terminal according to the Wi-Fi Direct configuration information of the new group to be created, which is received by the ninth receiving submodule 14223; where the Wi-Fi Direct configuration information of the new group to be created is sent by the second terminal to the first terminal after the second terminal selects one from unused MAC entities in the second terminal as a MAC entity to be used by the second terminal in the new group to be created, selects one from unused MAC entities in the first terminal, and sets the Wi-Fi Direct configuration information of the new group to be created, when the second terminal determines, according to the Wi-Fi Direct configuration information of the first terminal and the Wi-Fi Direct configuration information of the second terminal, that the first terminal and the second terminal do not belong to a same group and that both the first terminal and the second terminal include at least one unused MAC entity, and the second terminal determines, according to the group information of the first terminal and the group information of the second terminal, that at least one of the first terminal and the second terminal is a group owner; and the Wi-Fi Direct configuration information of the new group to be created further includes an address of the MAC entity selected by the second terminal from the first terminal.

In this embodiment, if only one of the first terminal and the second terminal is a group owner, the terminal being a group owner in the existing group must be a client in the new group, and the group owner intent of the terminal must be set to be smaller than the group owner intent of the peer end in the Wi-Fi Direct configuration information of the new group; if both the first terminal and the second terminal are group owners in the existing group, group owner intents of the two terminals in the configuration information of the new group may be set at random, as long as values of the group owner intents of the two terminals are set to be different.

In the foregoing embodiment, the first terminal and the second terminal exchange Wi-Fi Direct configuration information by using an NFC connection, and a device discovery procedure and a GO negotiation procedure are implicitly included in the exchange process, thereby sparing handshake procedures such as device discovery, GO negotiation, and WPS authentication information exchange that are performed by using radio signaling and defined in the Wi-Fi Direct protocol, and simplifying a Wi-Fi Direct connection establishment procedure. In addition, the Wi-Fi Direct protocol specifies that a client cannot actively discover a GO or a client of another group. In this scenario, a Wi-Fi Direct connection cannot be established by using radio signaling, but this restriction does not exist when the technical solution provided by this embodiment is used. As long as the first terminal and the second terminal are within an NFC communication range, the first terminal and the second terminal can exchange configuration information, and both can establish a Wi-Fi Direct connection between the first terminal and the second terminal.

Figure 16:
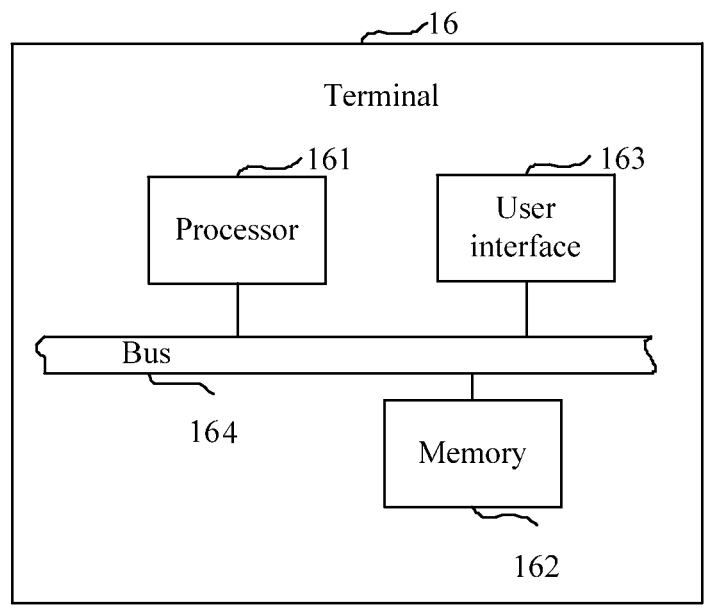
FIG. 16 is a schematic structural diagram of still another embodiment of a terminal according to the present invention.

FIG. 16 is a schematic structural diagram of still another embodiment of a terminal according to the present invention. The terminal 16 can be used as a first terminal, and as shown in FIG. 16, the terminal 16 may include: at least one processor 161 and a memory 162. The memory 162 is configured to store an executable program code, and the processor 161 is configured to run, by reading the executable program code stored in the memory 162, a program corresponding to the executable program code so as to: receive Wi-Fi Direct configuration information of a second terminal, which is sent by the second terminal through an NFC connection between the first terminal and the second terminal, where the Wi-Fi Direct configuration information of the second terminal includes group information of the second terminal; and establish a Wi-Fi Direct connection with the second terminal according to Wi-Fi Direct configuration information of the first terminal and the Wi-Fi Direct configuration information of the second terminal, if it is determined, according to group information of the first terminal and the group information of the second terminal, that neither the first terminal nor the second terminal is a member of an existing group; or establish, if it is determined, according to group information of the first terminal and the group information of the second terminal, that at least one of the first terminal and the second terminal is a member of an existing group, a Wi-Fi Direct connection with the second terminal according to Wi-Fi Direct configuration information of the existing group or a new group to be created.

During specific implementation, the foregoing terminal may further include a user interface 163 and a bus 164. The processor 161, the memory 162, and the user interface 163 are all connected to the bus 164.

In addition, when establishing a communication connection, the first terminal in this embodiment may establish a communication connection with the second terminal according to a procedure provided by a method embodiment of the present invention. Details are not repeated herein.

The foregoing terminal simplifies a Wi-Fi Direct connection establishment procedure. As long as the first terminal and the second terminal are within an NFC communication range, the first terminal and the second terminal can exchange configuration information, and both can establish a Wi-Fi Direct connection between the first terminal and the second terminal.

Figure 17:
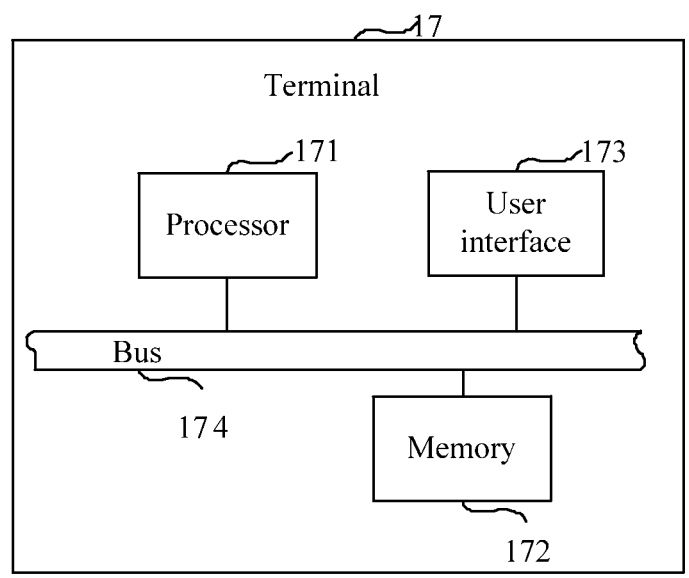
FIG. 17 is a schematic structural diagram of still another embodiment of a terminal according to the present invention.

FIG. 17 is a schematic structural diagram of still another embodiment of a terminal according to the present invention. The terminal 17 can be used as a first terminal, and as shown in FIG. 17, the terminal 17 may include: at least one processor 171 and a memory 172. The memory 172 is configured to store an executable program code, and the processor 171 is configured to run, by reading the executable program code stored in the memory 172, a program corresponding to the executable program code so as to: send Wi-Fi Direct configuration information of the first terminal to a second terminal through an NFC connection between the first terminal and the second terminal, where the Wi-Fi Direct configuration information of the first terminal includes group information of the first terminal; and establish a Wi-Fi Direct connection with the second terminal according to the Wi-Fi Direct configuration information of the first terminal and Wi-Fi Direct configuration information of the second terminal, if neither the first terminal nor the second terminal is a member of an existing group; or establish, if at least one of the first terminal and the second terminal is a member of an existing group, a Wi-Fi Direct connection with the second terminal according to Wi-Fi Direct configuration information of the existing group or a new group to be created.

During specific implementation, the foregoing terminal may further include a user interface 173 and a bus 174. The processor 171, the memory 172, and the user interface 173 are all connected to the bus 174.

In addition, when establishing a communication connection, the first terminal in this embodiment may establish a communication connection with the second terminal according to a procedure provided by a method embodiment of the present invention. Details are not repeated herein.

The foregoing terminal simplifies a Wi-Fi Direct connection establishment procedure. As long as the first terminal and the second terminal are within an NFC communication range, the first terminal and the second terminal can exchange configuration information, and both can establish a Wi-Fi Direct connection between the first terminal and the second terminal.

Persons skilled in the art can understand that the accompanying drawings are only schematic diagrams of exemplary embodiments and that the modules or procedures in the accompanying drawings may be not necessary for the implementation of the present invention.

Persons skilled in the art can understand the modules of the apparatuses in the embodiments may be disposed in the apparatuses as described in the embodiments or disposed in one or more apparatuses other than the apparatuses in the embodiments. The modules according to the above embodiments may be combined into one module, or further split into multiple submodules.

Finally, it should be noted that the foregoing embodiments are merely exemplary embodiments of the present invention and are not intended to limit the present invention. Although the present invention is described in detail with reference to the foregoing embodiments, persons of ordinary skill in the art should understand that they may still make modifications to the foregoing embodiments or make equivalent replacements to some technical features thereof, without departing from the scope of the present invention.

What is claimed is:

1. A method for establishing a communication connection, comprising:
   sending, by a first terminal, wireless fidelity (Wi-Fi) Direct configuration information of the first terminal to a second terminal through a near field communication (NFC) connection between the first terminal and the second terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs;
   receiving, by the first terminal, Wi-Fi Direct configuration information of the second terminal from the second terminal through the NFC connection between the first terminal and the second terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; and
   establishing a Wi-Fi Direct connection between the first terminal and the second terminal according to the Wi-Fi Direct configuration information of the second terminal.

2. The method according to claim 1, if the first terminal being not a member of an existing group and the second terminal being not a member of an existing group, wherein the establishing a Wi-Fi Direct connection between the first terminal and the second terminal according to the Wi-Fi Direct configuration information of the second terminal comprises:
   establishing, by the first terminal, the Wi-Fi Direct connection with the second terminal according to the Wi-Fi Direct configuration information of the second terminal.

3. The method according to claim 1, if the first terminal being not a member of an existing group and the second terminal being a group owner of an existing group to which the second terminal belongs, wherein the Wi-Fi Direct configuration information of the second terminal is Wi-Fi Direct configuration information of the existing group to which the second terminal belongs;
   the establishing a Wi-Fi Direct connection between the first terminal and the second terminal according to the Wi-Fi Direct configuration information of the second terminal comprises:
   joining, by the first terminal, the existing group to which the second terminal belongs according to the Wi-Fi Direct configuration information of the existing group.

4. The method according to claim 1, if the first terminal being not a member of an existing group and the second terminal being a client of an existing group to which the second terminal belongs, wherein the Wi-Fi Direct configuration information of the second terminal further comprises description information of a group owner of the existing group;
   the establishing a Wi-Fi Direct connection between the first terminal and the second terminal according to the Wi-Fi Direct configuration information of the second terminal comprises:
   joining, by the first terminal, the existing group to which the second terminal belongs according to the Wi-Fi Direct configuration information of the existing group.

5. The method according to claim 2, the establishing, by the first terminal, the Wi-Fi Direct connection with the second terminal according to the Wi-Fi Direct configuration information of the second terminal comprises:
   setting, by the first terminal according to the Wi-Fi Direct configuration information of the second terminal, the Wi-Fi Direct configuration information of a new group to be created;
   sending, by the first terminal, the Wi-Fi Direct configuration information of the new group to be created to the second terminal through the NFC connection; and
   establishing, by the first terminal, the Wi-Fi Direct connection with the second terminal according to the Wi-Fi Direct configuration information of the new group to be created.

6. The method according to claim 4, before the joining, by the first terminal, the existing group to which the second terminal belongs according to Wi-Fi Direct configuration information of the existing group, further comprises:
   requesting, by the first terminal, the group owner of the existing group for the encryption information in the Wi-Fi Direct configuration information of the existing group according to the description information of the group owner of the existing group;
   receiving, by the first terminal, the encryption information in the Wi-Fi Direct configuration information of the existing group sent by the group owner.

7. A method for establishing a communication connection, comprising:
   receiving, by a second terminal, wireless fidelity (Wi-Fi) Direct configuration information of a first terminal from the first terminal through a near field communication (NFC) connection between the second terminal and the first terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs;
   sending, by the second terminal, Wi-Fi Direct configuration information of the second terminal to the first terminal through the NFC connection between the second terminal and the first terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; and establishing a Wi-Fi Direct connection between the second terminal and the first terminal according to the Wi-Fi Direct configuration information of the first terminal.

8. The method according to claim 7, if the first terminal being not a member of an existing group and the second terminal being a group owner of an existing group to which the second terminal belongs, wherein the Wi-Fi Direct configuration information of the second terminal is Wi-Fi Direct configuration information of the existing group to which the second terminal belongs.

9. The method according to claim 7, if the first terminal being not a member of an existing group and the second terminal being a client of an existing group to which the second terminal belongs, wherein the Wi-Fi Direct configuration information of the second terminal further comprises description information of a group owner of the existing group.

10. A terminal, wherein the terminal is a first terminal and the terminal comprises:
a memory, configured to store an executable program code; and
at least one processor, configured to run, by reading the executable program code stored in the memory, a program corresponding to the executable program code so as to perform the following steps:
send wireless fidelity (Wi-Fi) Direct configuration information of the first terminal to a second terminal through a near field communication (NFC) connection between the first terminal and the second terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs;
receive Wi-Fi Direct configuration information of the second terminal from the second terminal through the NFC connection between the first terminal and the second terminal, wherein the Wi-Fi Direct configuration information of the second terminal comprises group information of the second terminal, the group information of the second terminal indicating: the second terminal being not a member of an existing group, the second terminal being a group owner of an existing group to which the second terminal belongs, or the second terminal being a client of an existing group to which the second terminal belongs; and
establish a Wi-Fi Direct connection between the first terminal and the second terminal according to the Wi-Fi Direct configuration information of the second terminal.

11. The terminal according to claim 10, if the first terminal being not a member of an existing group and the second terminal being not a member of an existing group, wherein the establish a Wi-Fi Direct connection between the first terminal and the second terminal according to the Wi-Fi Direct configuration information of the second terminal comprises:
establish the Wi-Fi Direct connection with the second terminal according to the Wi-Fi Direct configuration information of the second terminal.

12. The terminal according to claim 10, if the first terminal being not a member of an existing group and the second terminal being a group owner of an existing group to which the second terminal belongs, wherein the Wi-Fi Direct configuration information of the second terminal is Wi-Fi Direct configuration information of the existing group to which the second terminal belongs;
the establish a Wi-Fi Direct connection between the first terminal and the second terminal according to the Wi-Fi Direct configuration information of the second terminal comprises:
join the existing group to which the second terminal belongs according to the Wi-Fi Direct configuration information of the existing group.

13. The terminal according to claim 10, if the first terminal being not a member of an existing group and the second terminal being a client of an existing group to which the second terminal belongs, wherein the Wi-Fi Direct configuration information of the second terminal further comprises description information of a group owner of the existing group;
the establish a Wi-Fi Direct connection between the first terminal and the second terminal according to the Wi-Fi Direct configuration information of the second terminal comprises:
join the existing group to which the second terminal belongs according to the Wi-Fi Direct configuration information of the existing group.

14. The terminal according to claim 11, the establish the Wi-Fi Direct connection with the second terminal according to the Wi-Fi Direct configuration information of the second terminal comprises:
set the Wi-Fi Direct configuration information of the a new group to be created according to the Wi-Fi Direct configuration information of the second terminal;
send the Wi-Fi Direct configuration information of the new group to be created to the second terminal through the NFC connection; and
establish the Wi-Fi Direct connection with the second terminal according to the Wi-Fi Direct configuration information of the new group to be created.

15. The terminal according to claim 13, before the join the existing group to which the second terminal belongs according to Wi-Fi Direct configuration information of the existing group, further comprises:
request the group owner of the existing group for the encryption information in the Wi-Fi Direct configuration information of the existing group according to the description information of the group owner of the existing group;
receive the encryption information in the Wi-Fi Direct configuration information of the existing group sent by the group owner.

16. A terminal, wherein the terminal is a second terminal and the terminal comprises:
a memory, configured to store an executable program code; and
at least one processor, configured to run, by reading the executable program code stored in the memory, a program corresponding to the executable program code so as to perform the following steps:
receive wireless fidelity (Wi-Fi) Direct configuration information of a first terminal from the first terminal through a near field communication (NFC) connection between the second terminal and the first terminal, wherein the Wi-Fi Direct configuration information of the first terminal comprises group information of the first terminal, the group information of the first terminal indicating: the first terminal being not a member of an existing group, the first terminal being a group owner of an existing group to which the first terminal belongs, or the first terminal being a client of an existing group to which the first terminal belongs;

send Wi-Fi Direct configuration information of the second terminal to the first terminal through the NFC connection between the second terminal and the first terminal, wherein the Wi-Fi Direct configuration information of the second terminal comprises group information of the second terminal, the group information of the second terminal comprises: the second terminal being not a member of an existing group, or the second terminal being a group owner of an existing group to which the second terminal belongs, or the second terminal being a client of an existing group to which the second terminal belongs; and establish a Wi-Fi Direct connection between the second terminal and the first terminal according to the Wi-Fi Direct configuration information of the first terminal.

17. The terminal according to claim 16, if the first terminal being not a member of an existing group and the second terminal being a group owner of an existing group to which the second terminal belongs, wherein the Wi-Fi Direct configuration information of the second terminal is Wi-Fi Direct configuration information of the existing group to which the second terminal belongs.

18. The terminal according to claim 16, if the first terminal being not a member of an existing group and the second terminal being a client of an existing group to which the second terminal belongs, wherein the Wi-Fi Direct configuration information of the second terminal further comprises description information of a group owner of the existing group.

* * * * *